(12) United States Patent
Domingos

(10) Patent No.: US 11,490,590 B2
(45) Date of Patent: Nov. 8, 2022

(54) PORTABLE DOG CANTEEN

(71) Applicant: Dennis Domingos, Buellton, CA (US)

(72) Inventor: Dennis Domingos, Buellton, CA (US)

( * ) Notice: Subject to any disclaimer, the term of this patent is extended or adjusted under 35 U.S.C. 154(b) by 0 days.

(21) Appl. No.: 17/513,589

(22) Filed: Oct. 28, 2021

(65) Prior Publication Data

US 2022/0125008 A1 Apr. 28, 2022

Related U.S. Application Data

(60) Provisional application No. 63/106,805, filed on Oct. 28, 2020.

(51) Int. Cl.
*A01K 7/00* (2006.01)
*A45F 3/20* (2006.01)

(52) U.S. Cl.
CPC .................. *A01K 7/00* (2013.01); *A45F 3/20* (2013.01); *A45F 2003/205* (2013.01)

(58) Field of Classification Search
CPC .... A45C 3/20; B65D 21/086; A45F 2003/205
See application file for complete search history.

(56) References Cited

U.S. PATENT DOCUMENTS

| | | |
|---|---|---|
| 3,076,435 A | 2/1963 | Seymour |
| 5,105,768 A | 4/1992 | Johnson |
| 5,297,504 A | 3/1994 | Carrico |
| 6,067,935 A | 5/2000 | Rodes et al. |
| 6,148,767 A | 11/2000 | Manchess |
| 6,675,998 B2 * | 1/2004 | Forsman ............ B65D 75/5866 220/705 |
| 7,487,741 B2 | 2/2009 | Jordan |
| 7,497,186 B2 | 3/2009 | Dorton et al. |
| 7,669,554 B2 | 3/2010 | Clark |
| 7,780,035 B2 | 8/2010 | Rowe et al. |
| 7,878,148 B2 | 2/2011 | Swenson et al. |

(Continued)

FOREIGN PATENT DOCUMENTS

WO 2010115221 A1 10/2010

OTHER PUBLICATIONS

Israel Patent Office/ISA, International Search Report and Written Opinion for PCT Application No. PCT/US2021/057097, dated Dec. 30, 2021.

*Primary Examiner* — Andrew T Kirsch
(74) *Attorney, Agent, or Firm* — SoCal IP Law Group LLP; Guy Cumberbatch

(57) ABSTRACT

A portable pet canteen having a flexible bladder with peripheral edges and defining a footprint, an upper wall of the bladder defining an upper mouth, and a cavity being formed within the bladder. A rigid inner scaffold is secured to the upper mouth of the bladder and extends into the cavity. The inner scaffold has a height defined by side walls, the side walls having apertures for passage of water. An upper lid secures to an upper edge of the rigid inner scaffold such as with mating threads to form a closure such that the portable pet canteen is watertight. Water may be retained within the bladder until such time as the upper lid is removed and the canteen placed on the ground for the pet to drink from within the inner scaffold which provides a relatively wide opening. The canteen may be placed within a flexible outer cover for protection, which can also have various handles or straps for ease of transportation.

20 Claims, 20 Drawing Sheets

(56) References Cited

U.S. PATENT DOCUMENTS

| | | |
|---|---|---|
| 9,560,835 B1 | 2/2017 | Bastone, Jr. |
| 9,962,023 B1 | 5/2018 | Lauritano |
| 2007/0269142 A1 | 11/2007 | Tyska et al. |
| 2008/0314326 A1 | 12/2008 | Albert |
| 2012/0031342 A1 | 2/2012 | Whitney |
| 2013/0192529 A1 | 8/2013 | Kruger et al. |
| 2017/0086568 A1 | 3/2017 | Ehyai et al. |

* cited by examiner

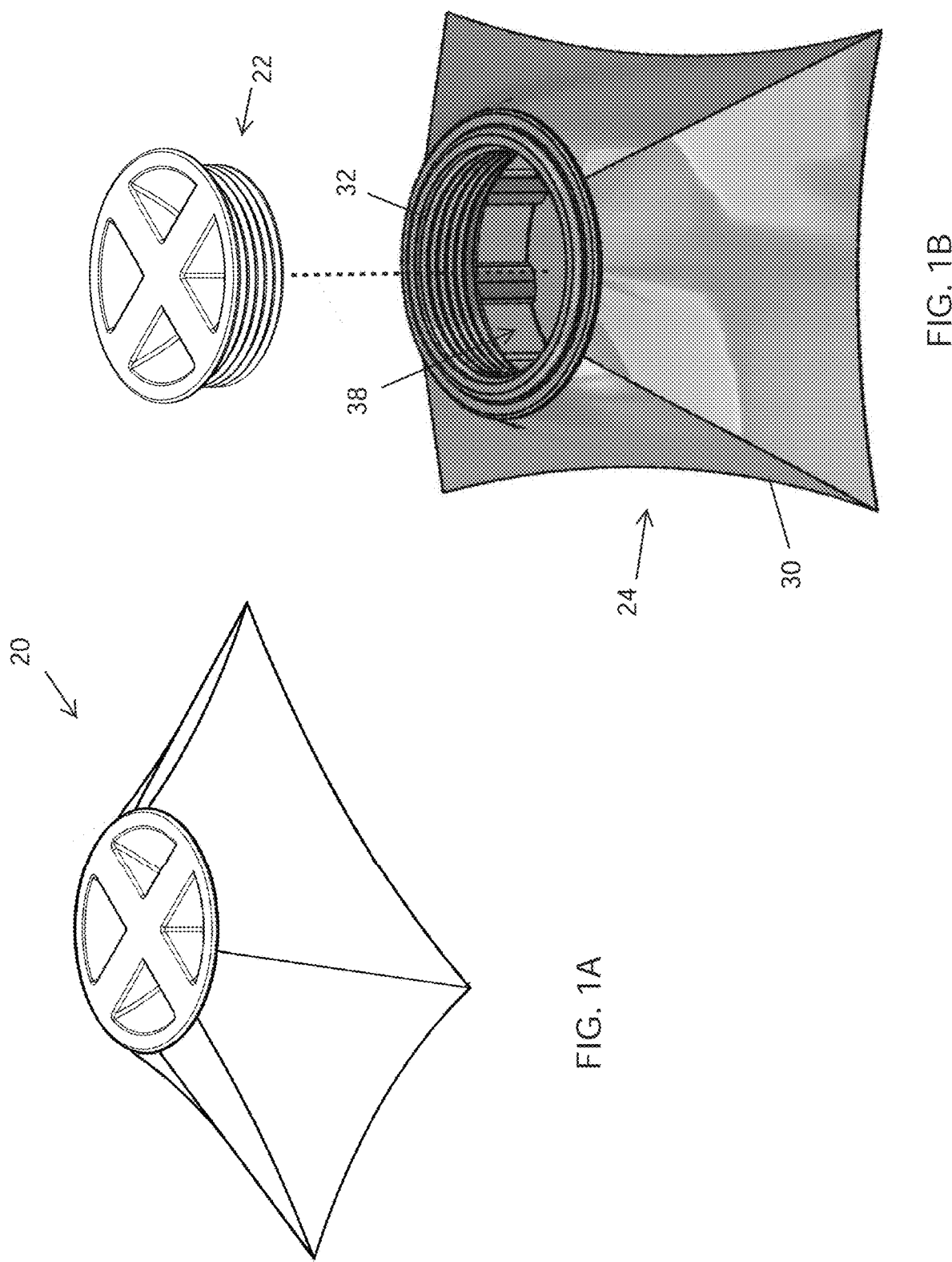

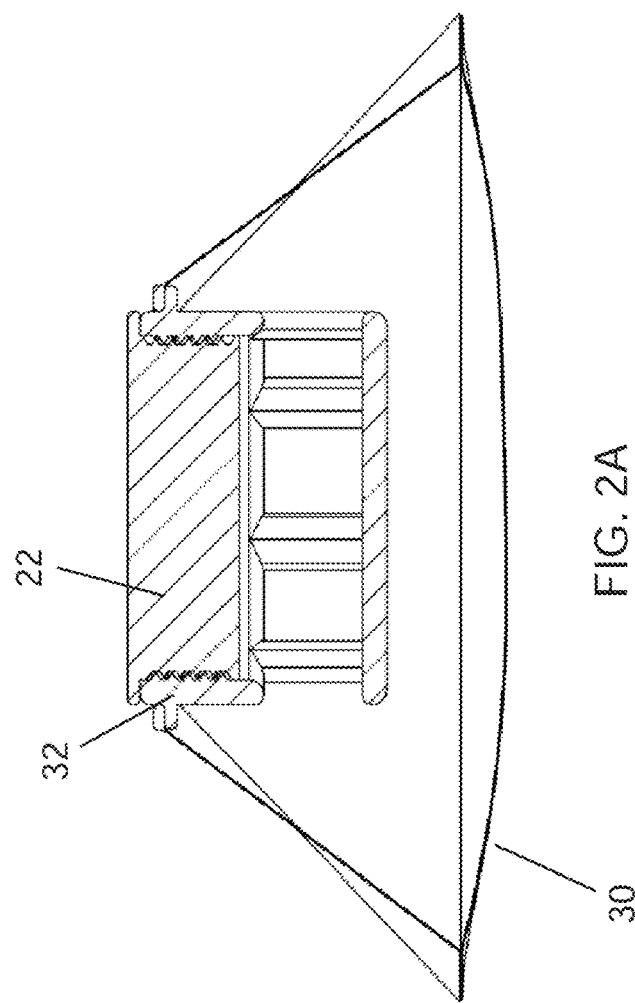
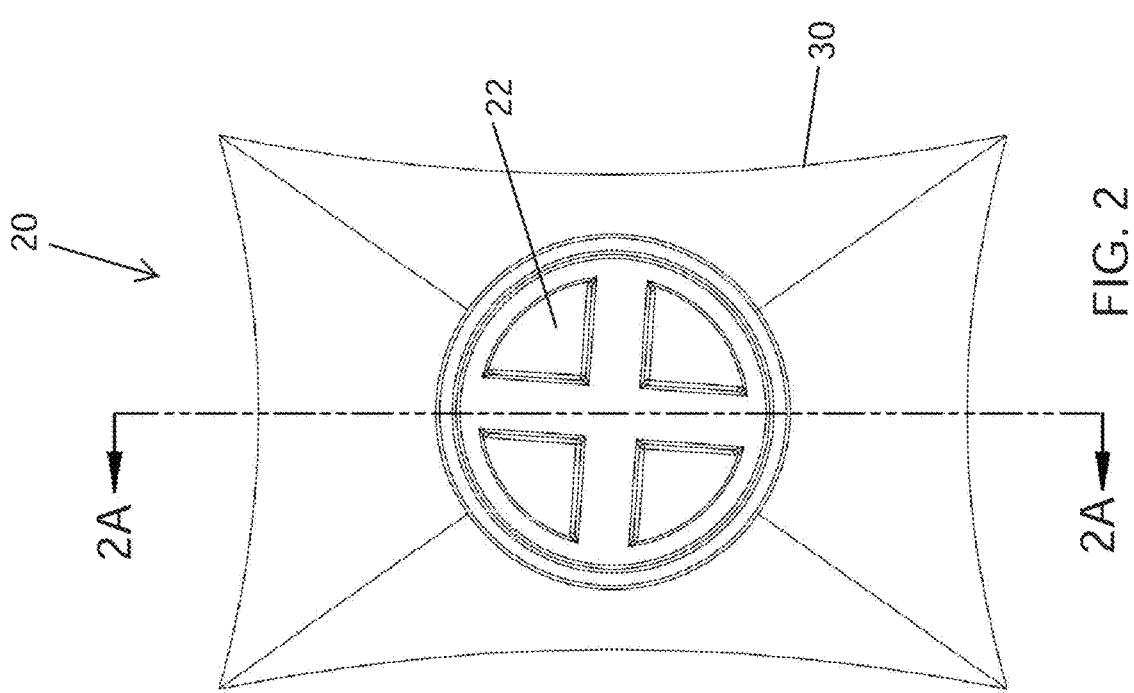

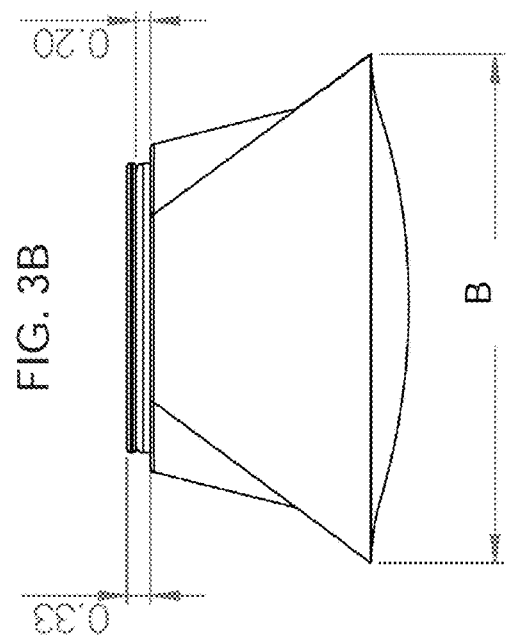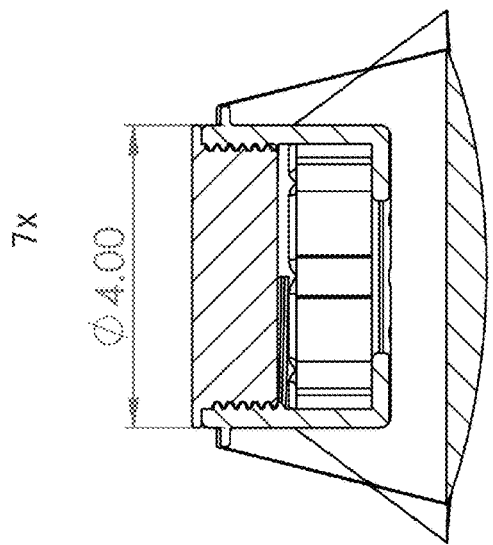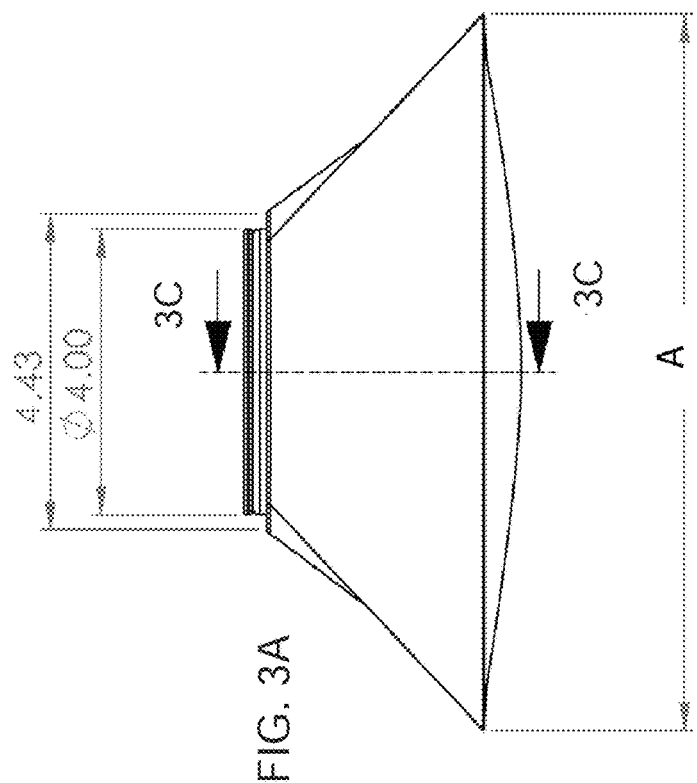

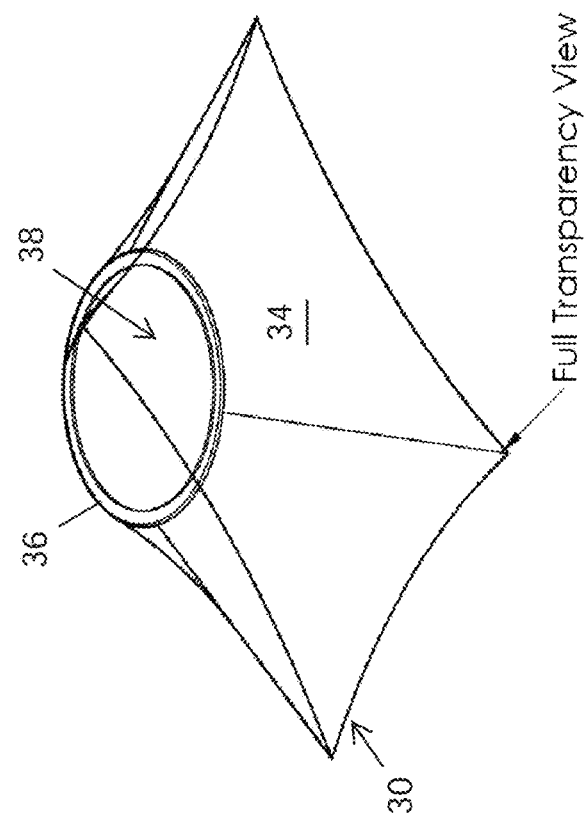
FIG. 4A
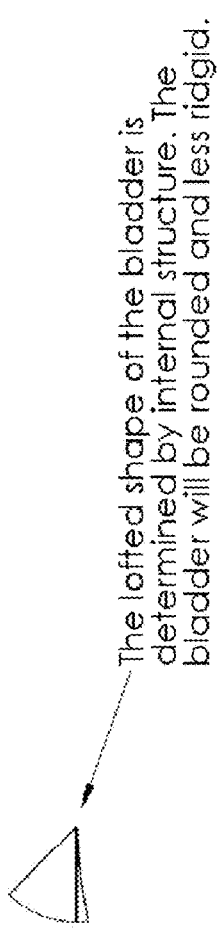
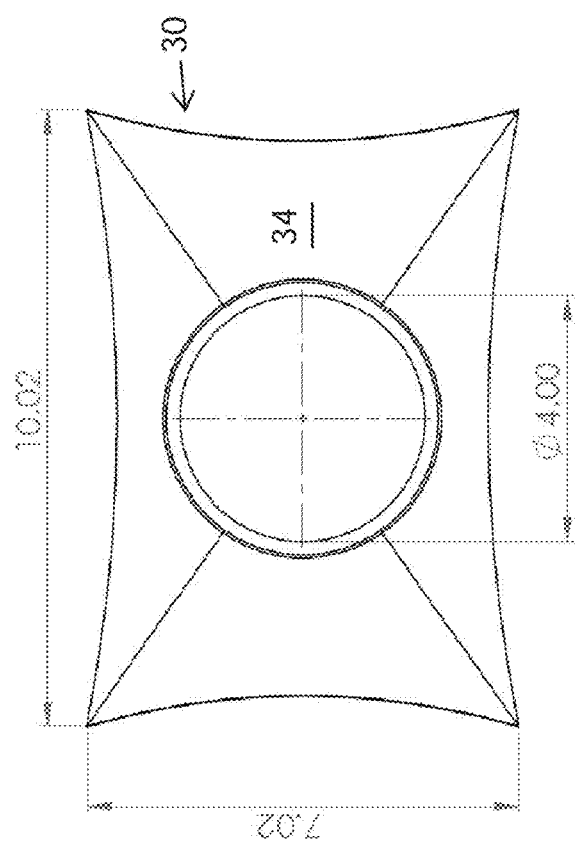
FIG. 4B
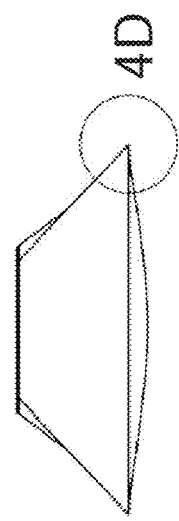
FIG. 4C

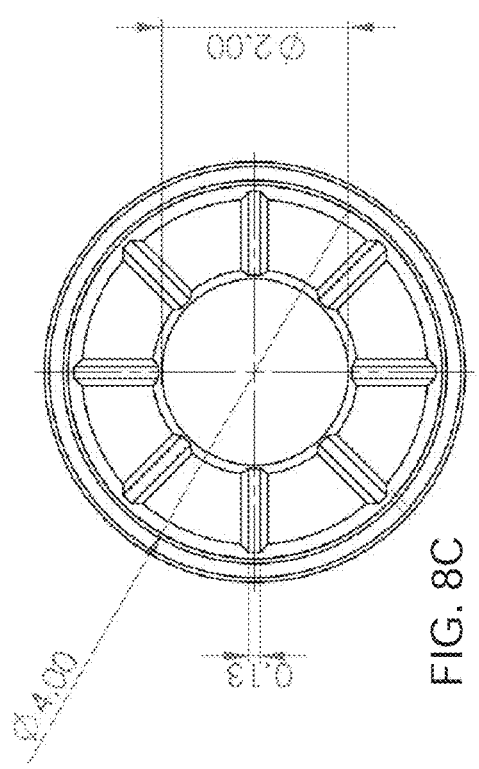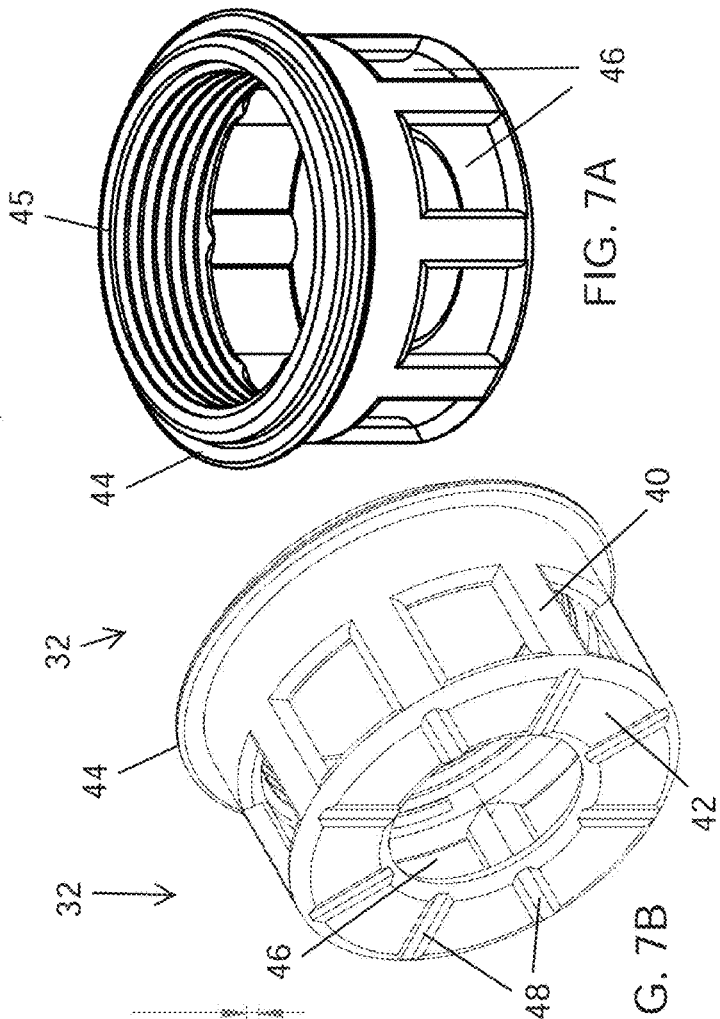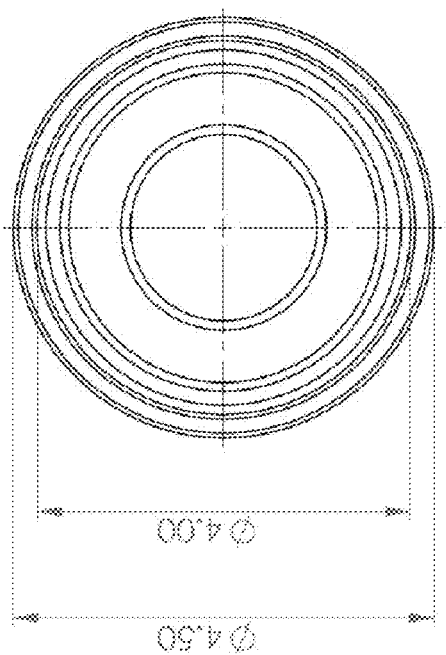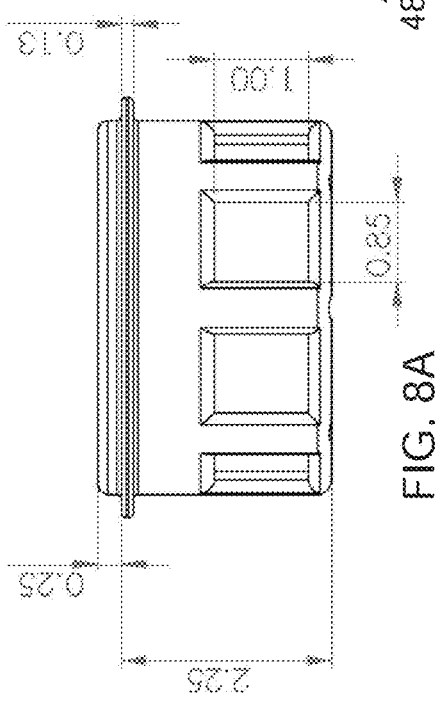

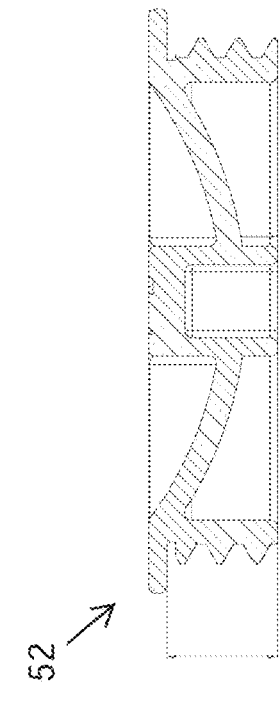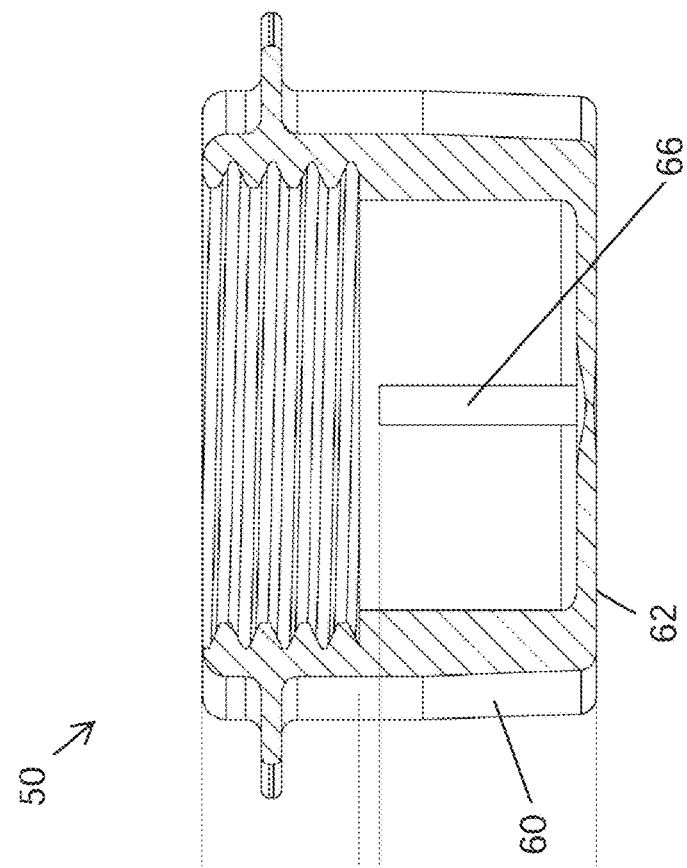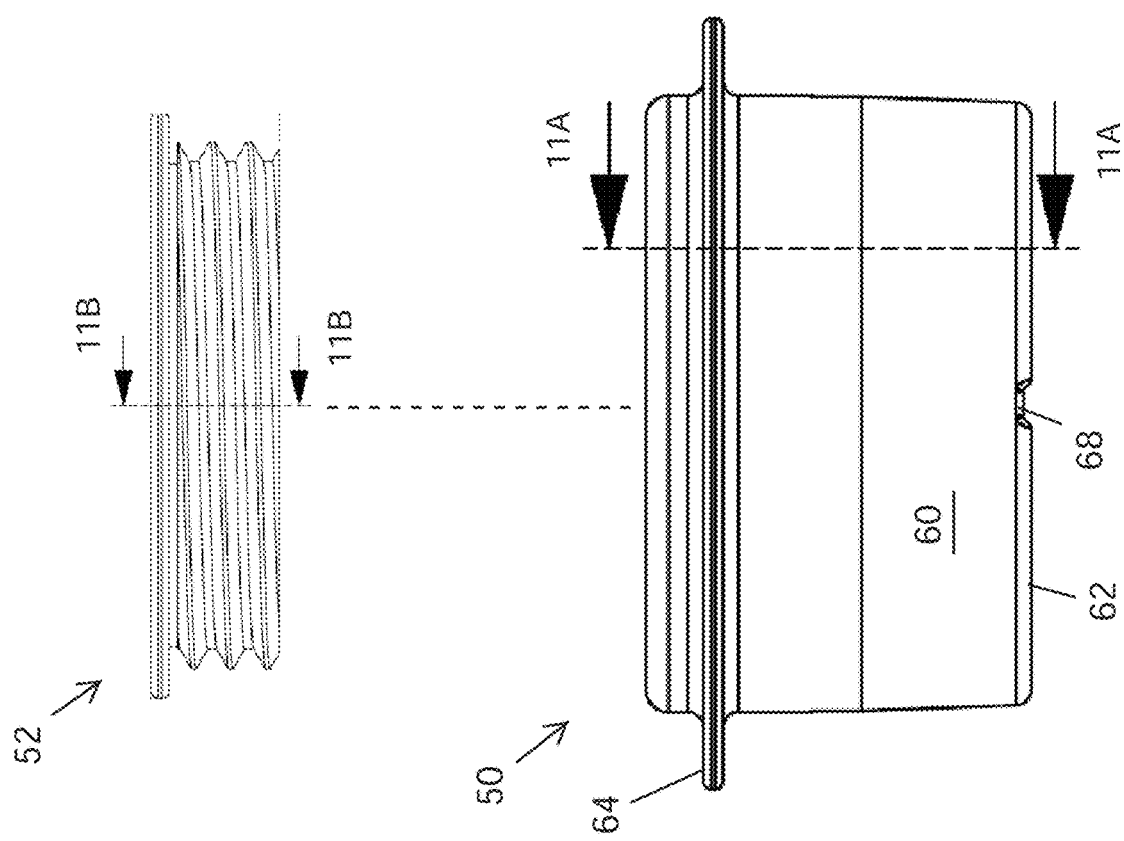

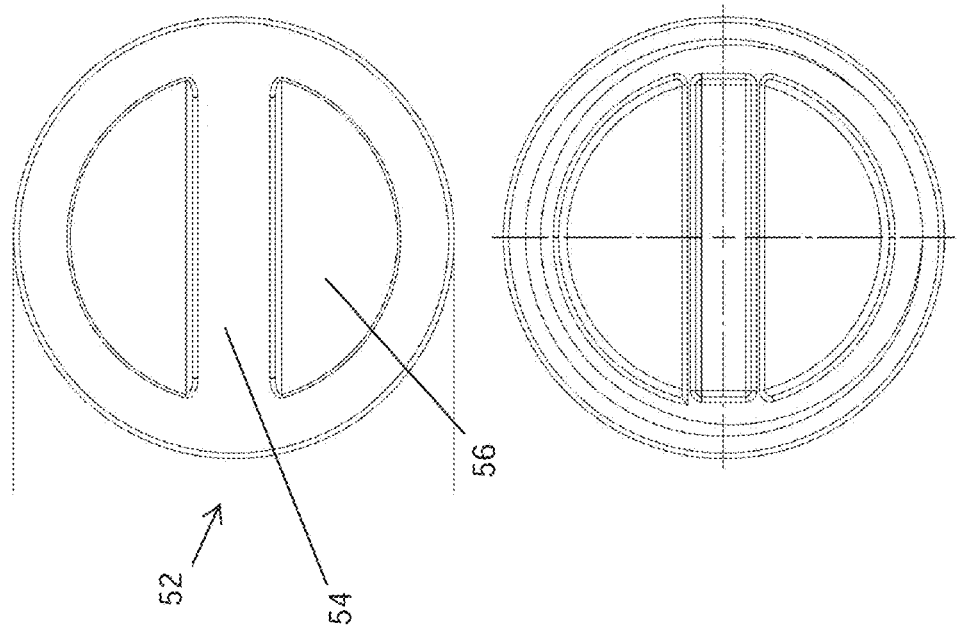
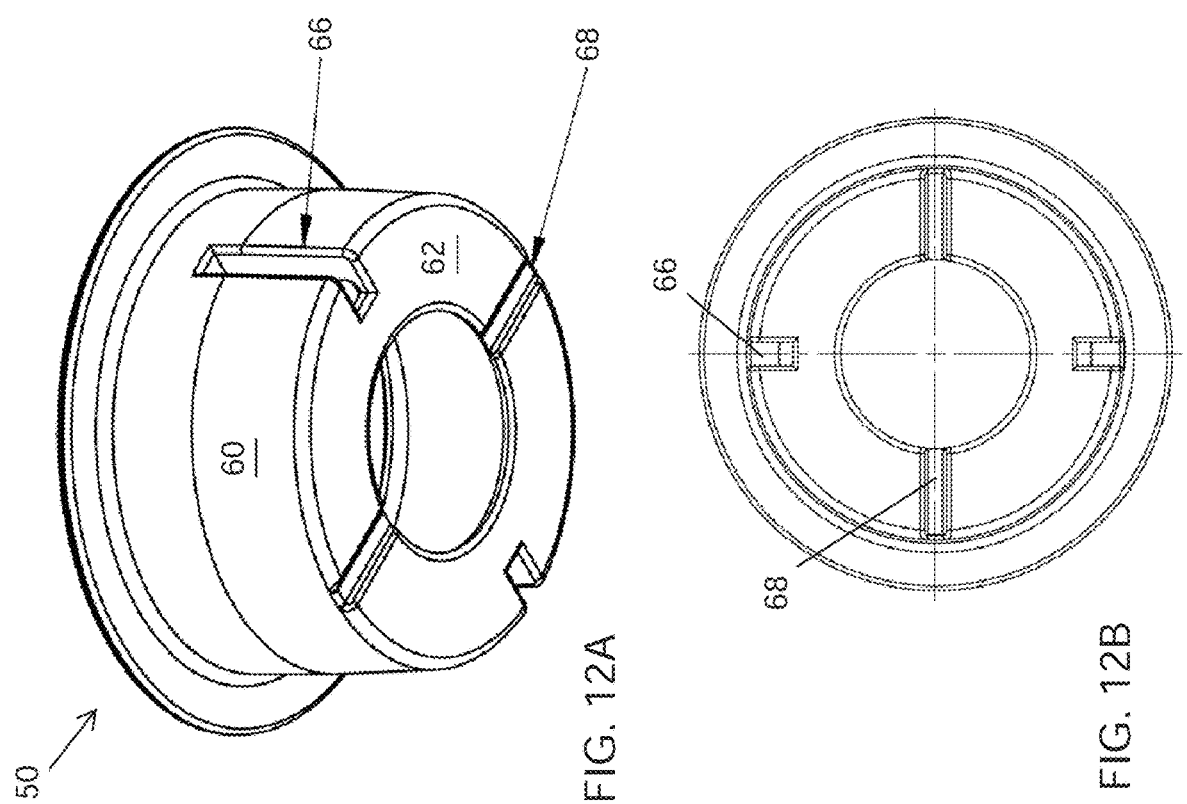

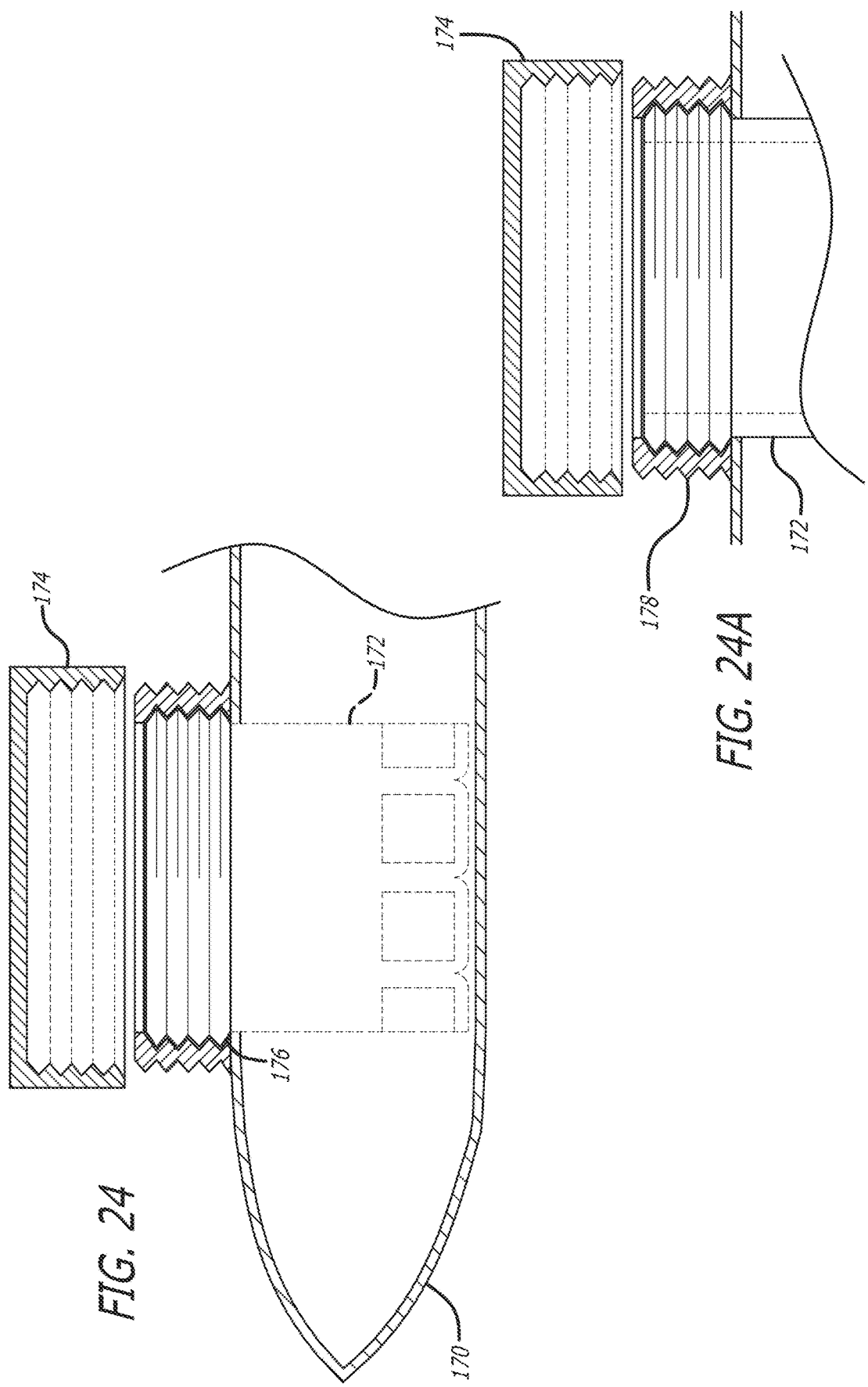

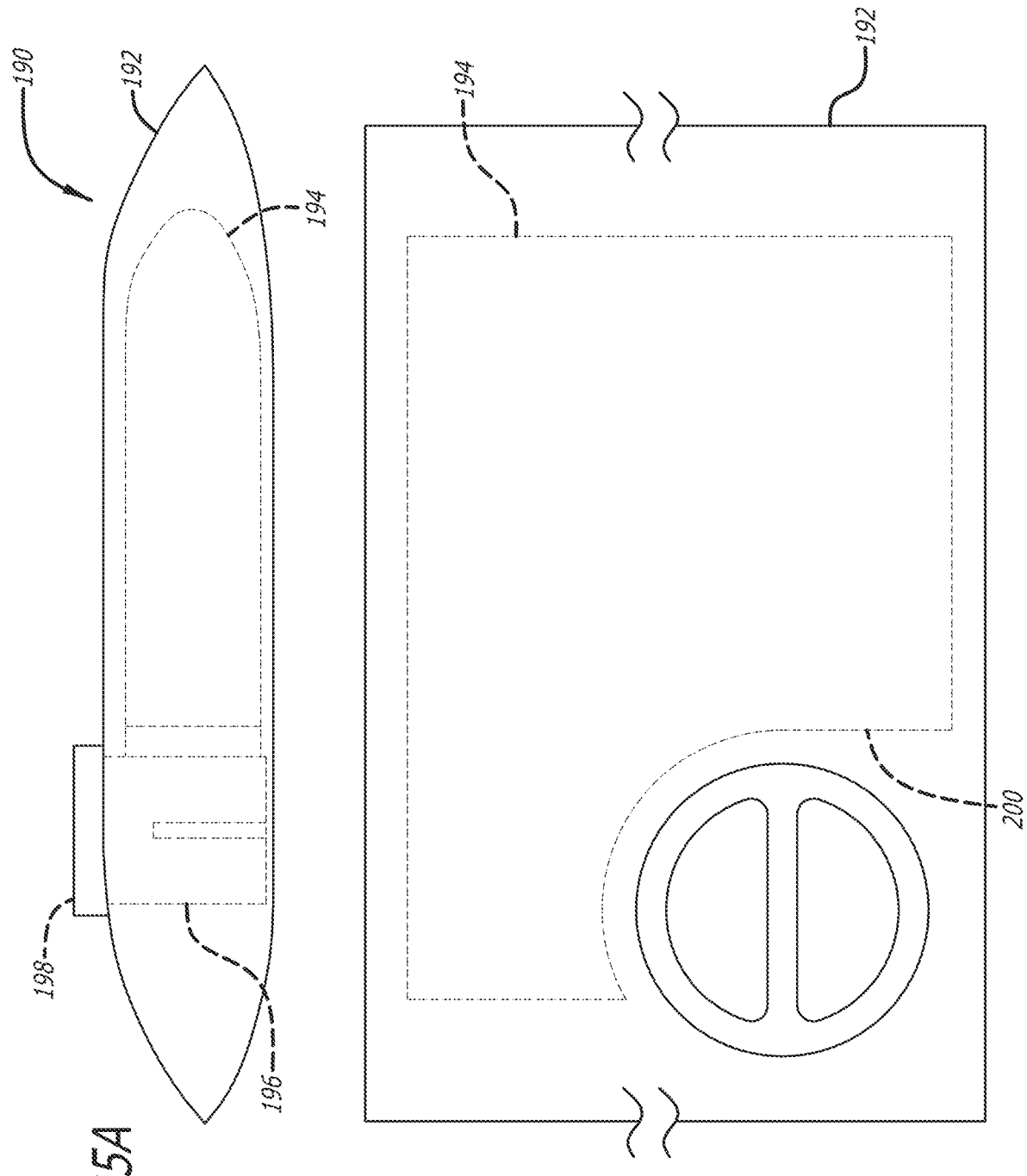

PORTABLE DOG CANTEEN

RELATED APPLICATIONS

The present application claims priority to provisional application No. 63/106,805 filed Oct. 28, 2020, under the same title, which is incorporated herein by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner have no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to a dog canteen with a lid that may be easily transported.

Description of the Related Art

Domesticated animals, especially dogs and cats, often accompany their owners on walks and hikes and on vacation trips such as camping trips and outings to the beach. It is important to bring nourishment and water on these trips for their pets. A variety of devices exist for pet owners to transport pet food. However, despite a considerable amount of time and effort designing portable devices for transporting pet drinking water, such efforts have yielded only marginally efficient and useful devices. For instance, transporting the water is often inconvenient, and most portable pet water bowls are simply collapsible or lightweight bowls have to be filled at the end destination. U.S. Pat. No. 6,148,767 to Manchess discloses a pet watering bowl that has a lower refillable bladder with a one-way valve that fills a drinking receptacle for the pet. The Manchess apparatus is somewhat complex and thus expensive, and perhaps as a result does not appear on pet store shelves Despite numerous solutions proposed for portable pet water bowls, there remains a need for improvements.

SUMMARY OF THE INVENTION

A portable pet canteen of the present application is lightweight and relatively inexpensive to manufacture. The pet canteen utilizes a flexible bladder filled with water with a wide upper opening, and a rigid insert or scaffold that fits within the opening. The scaffold has a wide upper mouth though which a pet can access water in the balder, and a lid closure. The scaffold extends down into the bladder cavity, preferably to the bottom, and has a number of apertures in side and bottom walls so that water can freely enter the cup or inner volume formed within the scaffold.

A first embodiment of a portable pet canteen comprises a flexible water-impermeable bladder having peripheral edges defining a footprint, an upper wall of the bladder defining an upper opening, and a water-tight cavity formed within the bladder. A rigid inner scaffold smaller in periphery than the footprint of the bladder is secured to the upper opening of the bladder and extends into the cavity. The inner scaffold has a height defined by side walls surrounding an inner volume and an upper mouth with a diameter of at least 3 inches. The side walls have at least one aperture for free flow of water between the bladder cavity and the inner volume within the inner scaffold side walls, such that a pet may access water within the inner volume through the upper mouth. An upper lid secures over the upper mouth edge of the inner scaffold to form a closure such that the pet canteen is watertight when closed.

A second embodiment of a portable pet canteen comprises a flexible water-impermeable bladder having peripheral edges defining a footprint, an upper wall of the bladder defining an upper opening, and a water-tight cavity formed within the bladder. A rigid inner scaffold smaller in periphery than the footprint of the bladder is secured to the upper opening of the bladder and extends into the cavity. The inner scaffold has a height defined by side walls surrounding an inner volume and an upper mouth. The inner scaffold has a base and vertical side walls and at least one vertically-oriented aperture extending from the base upward for free flow of water between the bladder cavity and the inner volume. The base extends radially inward from the side walls and has a central aperture for free flow of water between the bladder cavity and the inner volume within the side walls. The base further has a plurality of grooves formed on an underside thereof to provide channels for water flow from around the inner scaffold to the central aperture, such that a pet may access water within the inner volume through the upper mouth An upper lid secures over the upper mouth of the inner scaffold to form a closure such that the pet canteen is watertight when closed.

The water-impermeable bladder may have a rectangular footprint and the inner scaffold a circular profile as seen from above. The inner scaffold may have generally tubular and vertical side walls with at least one vertically-oriented aperture extending from a base of the inner scaffold upward. The base of the inner scaffold may extend radially inward from the side walls and have a central aperture for free flow of water between the bladder cavity and the inner volume within the side walls. Further, the base may have a plurality of grooves formed on an underside thereof to provide channels for water flow from around the inner scaffold to the central aperture.

In one embodiment, the inner scaffold has a base and vertical side walls and at least one vertically-oriented aperture extending from the base upward, the base extending radially inward from the side walls and having a central aperture for free flow of water between the bladder cavity and the inner volume within the side walls, and the base further having a plurality of grooves formed on an underside thereof to provide channels for water flow from around the inner scaffold to the central aperture.

There may be just two diametrically-opposed vertically-oriented apertures. The vertically-oriented apertures may extend downward and intersect the base so that they are open to the bottom of the scaffold. There may be just two grooves aligned radially with each other and extending perpendicularly relative to a diametric alignment of the vertically-oriented apertures.

The portable pet canteen may further include a hollow interior frame positioned within the bladder to prevent the bladder from collapsing, the frame being perforated or otherwise having flow apertures/channels to permit water to distribute evenly across the floor of the bladder.

The bladder may comprise a component of an existing hydration bladder with a rigid rim at the upper opening and a cap adapted to engage and close the rigid rim, and wherein the inner scaffold includes mating structure for engaging the rigid rim, once the cap is removed, and converting the hydration bladder to a pet canteen.

The portable pet canteen may further include a flexible outer cover sized to enclose the pet canteen and protect the bladder, the outer cover being formed of canvas, leather, polyester, or nylon. The outer cover may have a harness attached thereto configured to enable the pet canteen with outer cover to be carried by a user, a pet, or any other object which can transport the canteen.

DESCRIPTION OF THE DRAWINGS

FIG. 1A is a perspective view of an embodiment of an assembled portable pet canteen, and FIG. 1B is a perspective view with an upper lid exploded.

FIG. 2 is a top plan view of the exemplary portable pet canteen, and FIG. 2A is a vertical sectional view therethrough.

FIGS. 3A and 3B are side elevational views of the assembled portable canteen, and FIG. 3C is a vertical sectional view taken along line 3C-3C of FIG. 3A.

FIG. 4A is a perspective view of a water-impermeable bladder for the exemplary portable pet canteen, FIG. 4B is a top plan view thereof, FIG. 4C is a side elevational view, and FIG. 4D is an enlargement of one lower corner of the bladder.

FIGS. 7A and 7B are perspective views of the rigid inner scaffold, and FIGS. 8A-8C are orthogonal views thereof.

FIG. 11 is a side elevational exploded view of an alternative rigid inner scaffold having an upper lid, and FIGS. 11A and 11B are sectional views through the scaffold and lid, respectively.

FIGS. 12A and 12B are perspective and bottom plan views of the scaffold of FIG. 11 illustrating a preferred pattern of wall apertures and floor grooves.

FIGS. 13A and 13B are top and bottom plan views of an exemplary lid seen in FIGS. 11 and 11A;

FIG. 24 is a schematic view of a hydration bladder having a modified inner scaffold adapted to convert the bladder for use as a pet canteen, and FIG. 24A is an enlargement of an upper portion of the scaffold and its lid.

FIGS. 25A and 25B are side elevational and top plan views of a still further modified pet canteen that utilizes a bladder and has a hollow interior frame to prevent the bladder from collapsing.

DETAILED DESCRIPTION

Figure 5A:
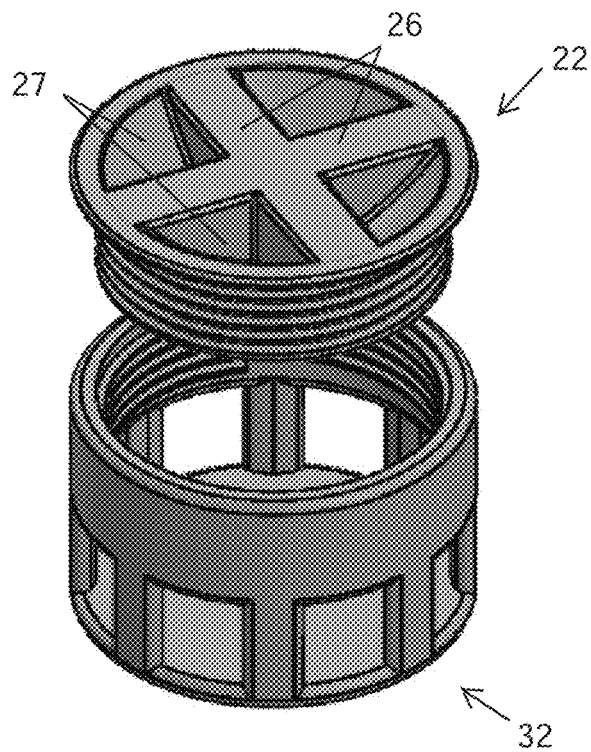
FIGS. 5A and 5B are perspective and side elevational exploded views, respectively, of a rigid inner scaffold having a first version of an upper lid.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the invention and are not intended to be limiting.

FIG. 1A is a perspective view of an embodiment of an assembled portable pet canteen 20, and FIG. 1B is a perspective view with an upper lid 22 exploded above the main body 24. FIG. 2 is a top plan view of the exemplary portable pet canteen 20, and FIG. 2A is a vertical sectional view therethrough.

The portable pet canteen 20 desirably comprises three components: a main body 24 comprising a bladder 30 and a rigid inner scaffold 32, and the upper lid 22. The rigid inner scaffold 32 fits within the bladder 30, and the upper lid 22 secures over the top of the scaffold, preferably by mating threads as shown, though various other closures as known by those of skill in the art are contemplated.

FIGS. 3A and 3B are side elevational views of the assembled portable canteen 20, and FIG. 3C is a vertical sectional view taken along line 3C-3C of FIG. 3A.

FIG. 4A is a perspective view of the exemplary portable pet canteen 20, FIG. 4B is a top plan view thereof. FIG. 4C is a side elevational view of the portable pet canteen 20, and FIG. 4D is an enlargement of one lower corner of a bladder 30. As seen from above, the bladder 30 has peripheral edges defining a footprint, in this case a modified rectangle with concave sides. The rigid inner scaffold 32 is smaller in periphery than the footprint of the bladder 30, and thus the bladder defines a larger volume for storage of water.

Figure 5B:
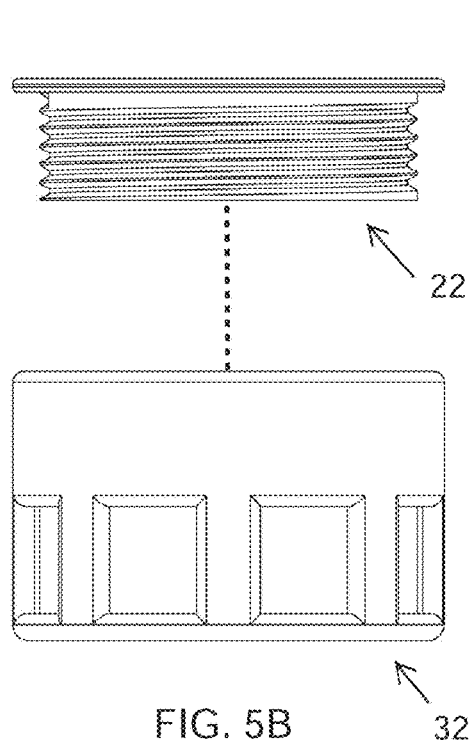
Figure 9:
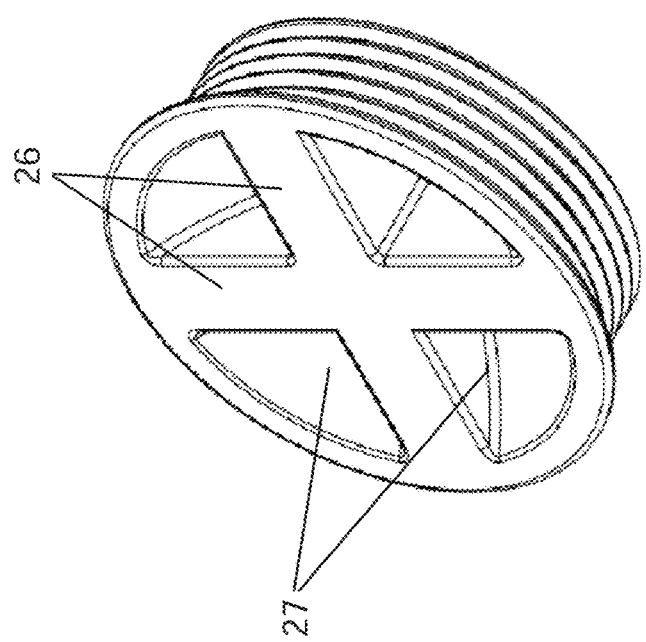
FIG. 9 is a perspective view of the first version of the upper lid.
Figure 10B:
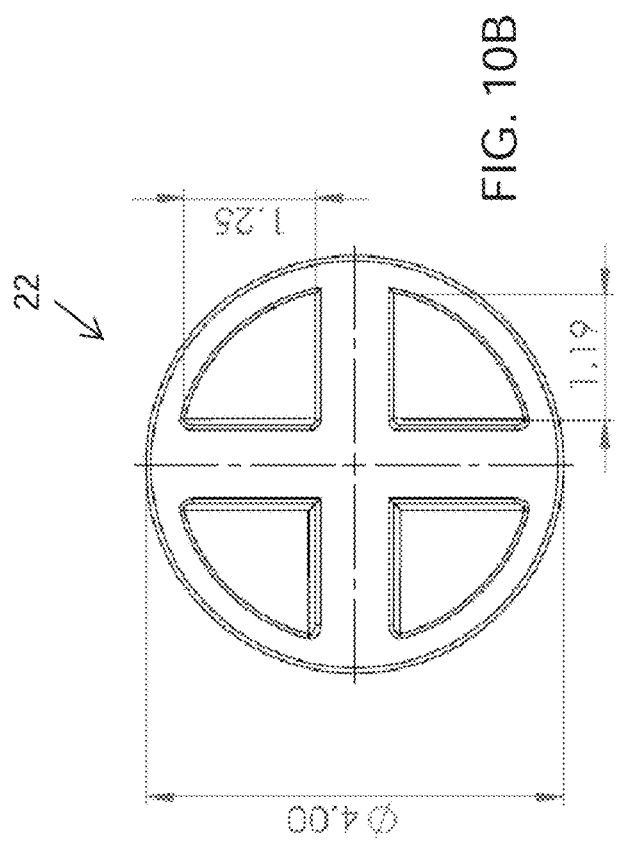
FIGS. 10A-10B are orthogonal views thereof.
Figure 10A:
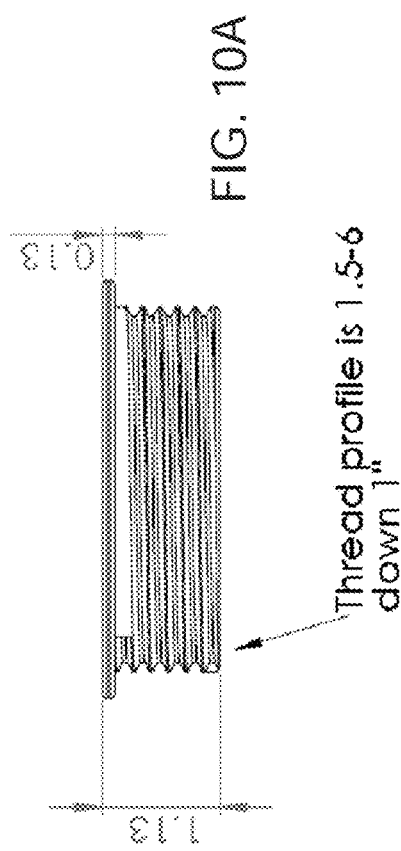

FIGS. 5A and 5B are perspective and side elevational exploded views, respectively, of the rigid inner scaffold 32 to which a first version of the upper lid 22 attaches. FIG. 9 is a perspective view of the first version of the upper lid 22, and FIGS. 10A-10B are orthogonal views thereof that provide exemplary dimensions. The first version of the upper lid 22 has a top surface defining two crossed struts 26 having indents 27 therebetween that provide finger holes to facilitate screwing and unscrewing of the lid 22.

Figure 6A:
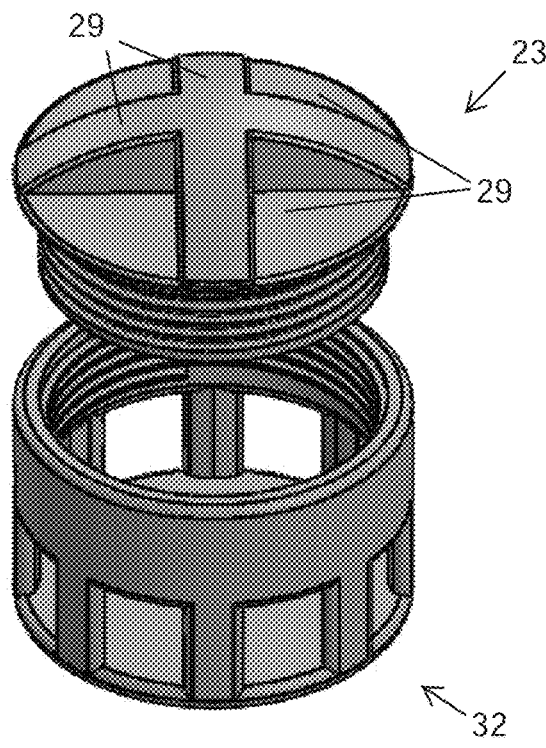
FIGS. 6A and 6B are perspective and side elevational exploded views, respectively, of the rigid inner scaffold having a second version of an upper lid.
Figure 6B:
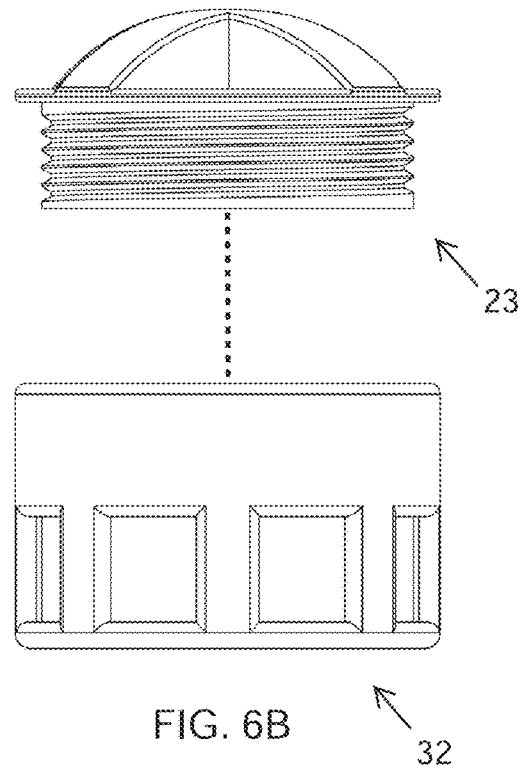

FIGS. 6A and 6B are perspective and side elevational exploded views, respectively, of the rigid inner scaffold 32 to which a second version of the upper lid 23 attaches. The second version of the upper lid 23 has two crossed struts 28 that project upward from a lid top having recesses 29 therebetween that provide finger holes to facilitate screwing and unscrewing of the lid 23.

The flexible bladder 30 and take a variety of forms, though the illustrated form has a generally rectangular plan view with sloping side walls 34 to form a somewhat pyramid shape. FIG. 3A indicates a longitudinal length A and the lateral width B at its widest point, an exemplary values of those dimensions are shown in FIG. 4B. The height at the center of the bladder 32 is desirably between about 2-6 inches. The bladder 30 is entirely flexible, such that the rigid inner scaffold 32 provides the only rigidity thereto. The inner scaffold 32 is desirably made of a rigid polymer, and molded and possibly machined to shape. The bladder 30 may be made of a variety of flexible water impermeable materials, such as rubber, silicone, water impermeable canvas, nylon or perhaps the substantially water impermeable material commonly found under the trademark GORTEX. Other materials include Polyethylene terephalate (PET #1), commonly used for water bottles for human consumption, high density polyethylene (HDPE), low density polyethylene (LDPE), polyvinyl chloride (PVC), polypropylene (PP) and polystyrene (PS). The bladder 30 may be composed of a resilient polymer, such as LDPE or PVC, so that it resumes its original shape when uncompressed, in the manner of a squeeze bottle.

As seen in FIGS. 4A and 4B, a circular upper mouth or opening 36 is formed at an upper end of the sloping side walls 34. The bladder 30 is entirely sealed except for at the upper opening 36 to provide a water-tight cavity 38 therein. Exemplary dimensions of the bladder 30 are shown in the drawings.

FIGS. 7A and 7B are perspective views of the rigid inner scaffold 32, and FIGS. 8A-8C are orthogonal views thereof. The inner scaffold 32 has a generally cylindrical profile with a tubular outer wall 40 extending upward from a flat base 42 to an open upper mouth 45. The inner scaffold 32 thus forms a cup shape that fills with water so that the pet can drink from it. The upper mouth desirably has a diameter of at least 3 inches, and preferably between 3-6 inches. Both the tubular outer wall 40 and the flat base 42 have relatively large windows or apertures 46 therein for free passage of water. A flange 44 at the upper edge of the tubular outer wall 40 provides a convenient attachment point for securing the scaffold 32 around the upper opening 36 of the bladder 30 through heat welding, adhesives, or the like. The flat base 42 also has lower veins or grooves which provide radial channels under the scaffold 32 and above the floor of the bladder 30 to permit water flow therethrough. The large apertures 46 formed in both the side walls 40 and bottom wall 42 permit free flow of water into the cup formed by the open mouth scaffold.

The rigid inner scaffold 32 thus extends downward into the water-tight cavity 38 of the bladder 30, and the upper lid 22 may be secured thereto to close the cavity. Once the cavity 38 is filled with water, and the lid 22 closed over the rigid inner scaffold 32, no water escapes. However, because of the relatively wide diameter of the tubular outer wall 40, removing the lid 22 provides a convenient access point for a pet to drink water from within the bladder 30. Likewise, the wide and relatively short height of the bladder 30 provides a good supply of water. The apertures 46 formed in the outer wall 40 and flat base 42 of the inner scaffold 32 permit water from the peripheral edges of the bladder 30 to flow from around to within the scaffold.

The inner scaffold 32 has a minimum height which supports the top and bottom panels of the bladder 30 apart from one another so as to both create the inner cavity 38 and also prevent the canteen 20 from collapse. That is, without the rigid inner scaffold 32, the top and bottom panels of the bladder would simply collapse flat and the water would run out. In the illustrated embodiment, the inner scaffold 32 has a height of 2.25 inches, which can be varied between 2-6 inches to vary the height of the upper mouth and also the volume of the inner cavity 38. At the same time, the large apertures formed in both the side walls 40 and bottom wall 42 permit free flow of water into the cup or volume formed by the open mouth scaffold.

FIG. 11 is a side elevational exploded view of an alternative rigid inner scaffold 50 having an upper lid 52, and FIGS. 11A and 11B are sectional views through the scaffold and lid, respectively. FIGS. 12A and 12B are perspective and bottom plan views of the scaffold 50 illustrating a preferred pattern of water flow apertures and grooves, which will be described below. The scaffold 50 may be secured within any of the bladders described herein which, when filled with water, forms a pet canteen.

The inner scaffold 50 again has a generally cylindrical profile with a tubular outer wall 60 extending upward from a flat base 62 to an open upper mouth 65. The inner scaffold 50 thus forms a cup shape. The upper mouth desirably has a diameter of at least 3 inches, and preferably between 3-6 inches. Both the tubular outer wall 60 and the flat base 62 have relatively large windows or apertures 66 therein for free passage of water. A flange 64 at the upper edge of the tubular outer wall 60 provides a convenient attachment point for securing the scaffold 50 around the upper opening 36 of the bladder 30 through heat welding, adhesives, or the like. The flat base 62 also has lower veins or grooves 68 which provide radial channels under the scaffold 50 and above the floor of the bladder 30 to permit free water flow therethrough. An owner need only place the canteen on the ground and remove the lid 52 from the scaffold 50 to enable a pet to freely drink through the open mouth of the scaffold without further action on the part of the owner.

The rigid inner scaffold 50 thus extends downward into the water-tight cavity 38 of the bladder 30, and the upper lid 52 may be secured thereto to close the cavity. Once the cavity 38 is filled with water, and the lid 52 closed over the rigid inner scaffold 50, no water escapes. However, because of the relatively wide diameter of the tubular outer wall 60, removing the lid 52 provides a convenient access point for a pet to drink water from within the bladder 30. Likewise, the wide and relatively short height of the bladder 30 provides a good supply of water. As seen in FIGS. 13A and 13B, the lid 52 has a single diametric strut 54 which creates two indents 56 on either side used to screw and unscrew the lid.

The apertures 66 formed in the outer wall 60 and flat base 62 of the inner scaffold 50 permit water from the peripheral edges of the bladder 30 to flow from around to within the scaffold. However, in contrast to the earlier-described embodiment, the vertically-oriented slots or apertures 66 in the outer wall 60 are reduced to just two diametrically-opposed to one another. As seen in FIGS. 12A and 12B, each of side apertures 66 extends downward and intersects the base 62 so that they are open to the bottom of the scaffold 50. Likewise, there are only two radial grooves 68 formed in the base 62 connecting the area around the scaffold 50 to the central aperture 66 in the base 62. Moreover, the radial grooves 68 are aligned radially with each other and perpendicularly relative to the diametric position of the side apertures 66 for greater dispersion of water. Reducing the number of apertures 66 and grooves 68 does not limit water ingress into the interior of the scaffold 50 for drinking, and reduces manufacturing costs.

Figure 14B:
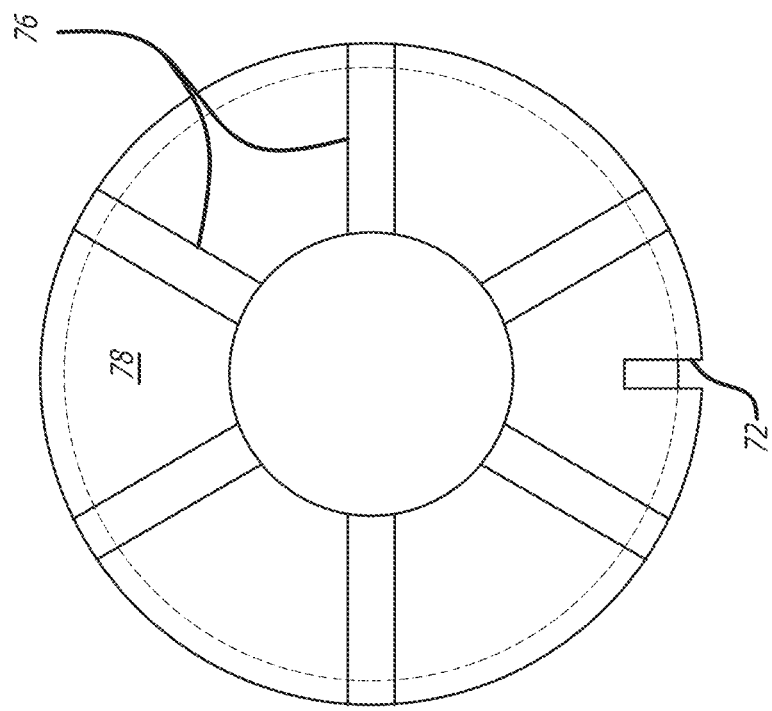
FIG. 14B is a bottom plan view thereof.
Figure 14A:
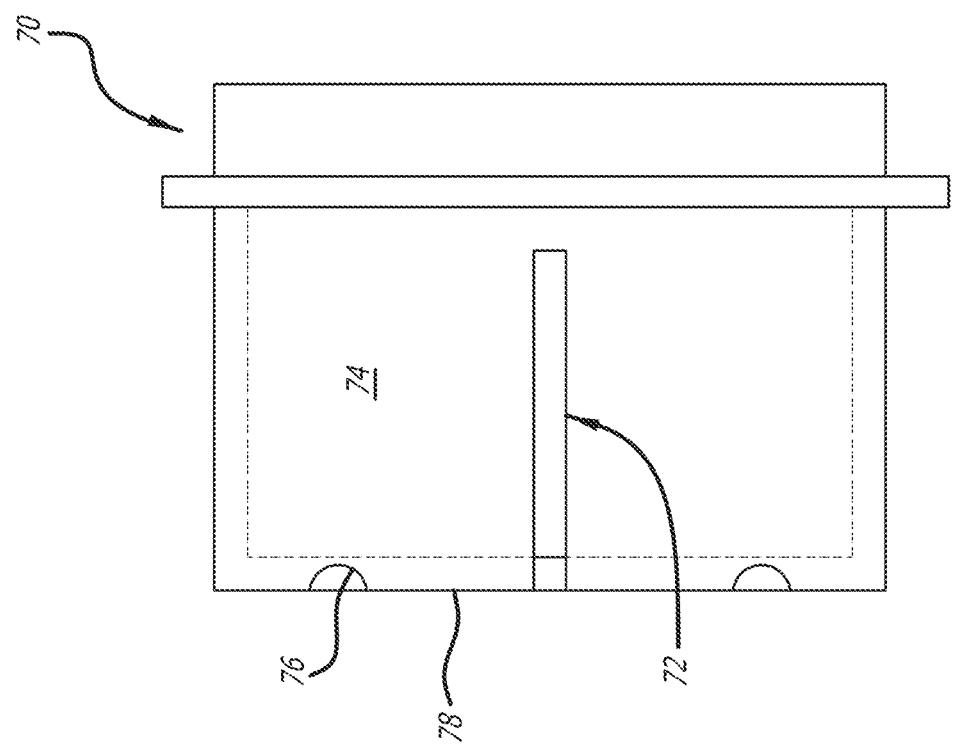
FIG. 14A is a side elevational view of another rigid inner scaffold with a different floor groove pattern.

FIG. 14A is a side elevational view of another rigid inner scaffold 70 with a different side aperture and floor groove pattern, and FIG. 14B is a bottom plan view thereof. The scaffold 70 this time has a single vertically-oriented slot or aperture 72 in the cylindrical outer wall 74. Further, as seen in FIG. 14B, there are six evenly-spaced radial veins or grooves 76 formed on the bottom of the base 78 of the scaffold 70. Each of the grooves 76 extends from the outer wall 74 to the central aperture 72 in the base 78, and thus facilitates fluid flow to the interior of the scaffold 70 when the water level within the bladder is low. Also shown in FIG. 14B is the lower opening of the side aperture 72 which permits flow from around to within the scaffold 70. The aperture 72 extends up from the base 78 to at least the lower end of the internal threads (not shown) which the lid engages.

Figure 15A:
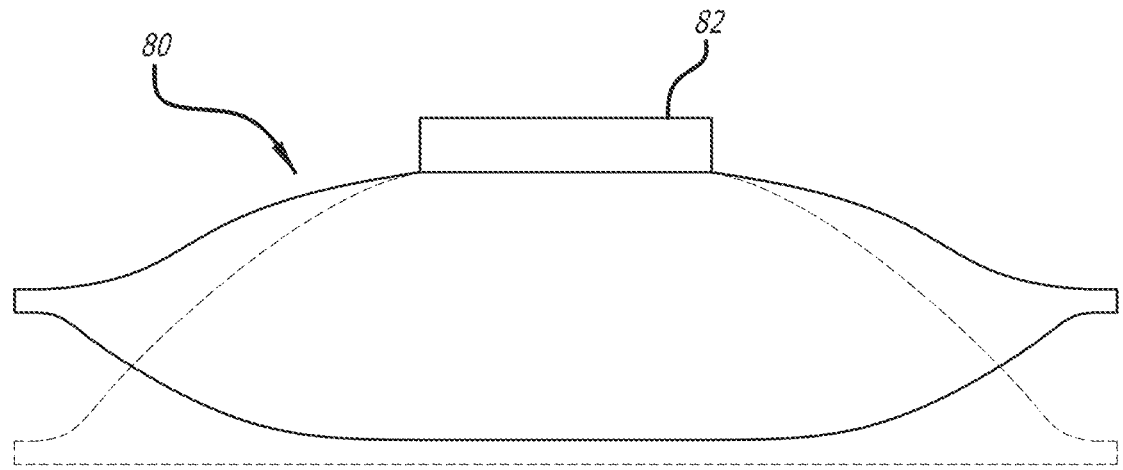
FIGS. 15A and 15B are side elevational and top plan views of another exemplary portable pet canteen of the present application.
Figure 15B:
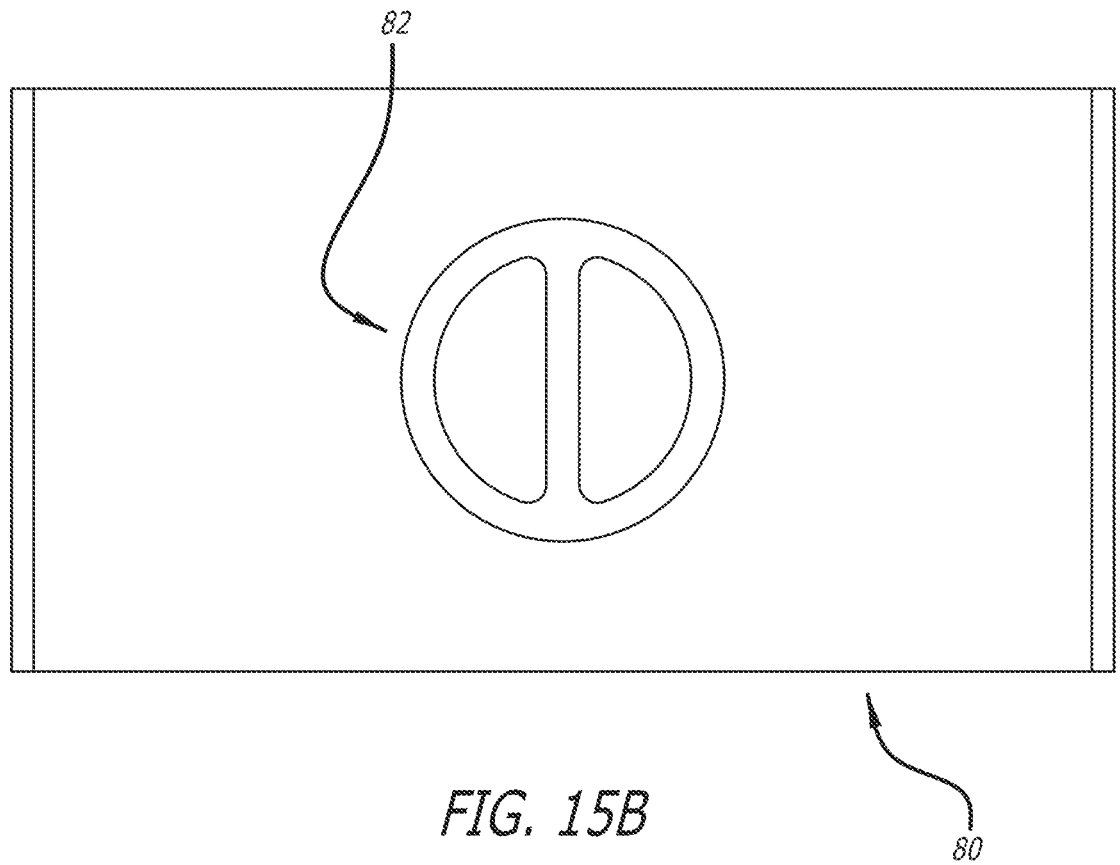

FIGS. 15A and 15B are side elevational and top plan views of another exemplary portable pet canteen of the present application. In this version, the bladder 80 is shown in two different configurations which are also relatively wide but not too tall, and having a more rounded or lenticular cross-section sectional shape formed by two generally rectangular panels welded together. The drawings show a vulcanized weld at opposite ends. The lid 82 over the inner scaffold is closed in these views, and the scaffold can be any of those described herein.

The bladder 80 in this embodiment again has a rectangular footprint from above, though the side view (FIG. 15A) shows a lenticular profile. It should be understood that a variety of peripheral shapes are contemplated, as well a number of different elevational profiles, and the application anticipates diversity in this aspect. Often, the particular shape will be determined by material or manufacturing considerations, or the particular customer or use to which the canteen will be marketed. The shape shown in FIGS. 15A and 15B is particularly well-suited to being encased in an outer cover, such as canvas, as described below with respect to FIGS. 18 and 19.

Figure 16:
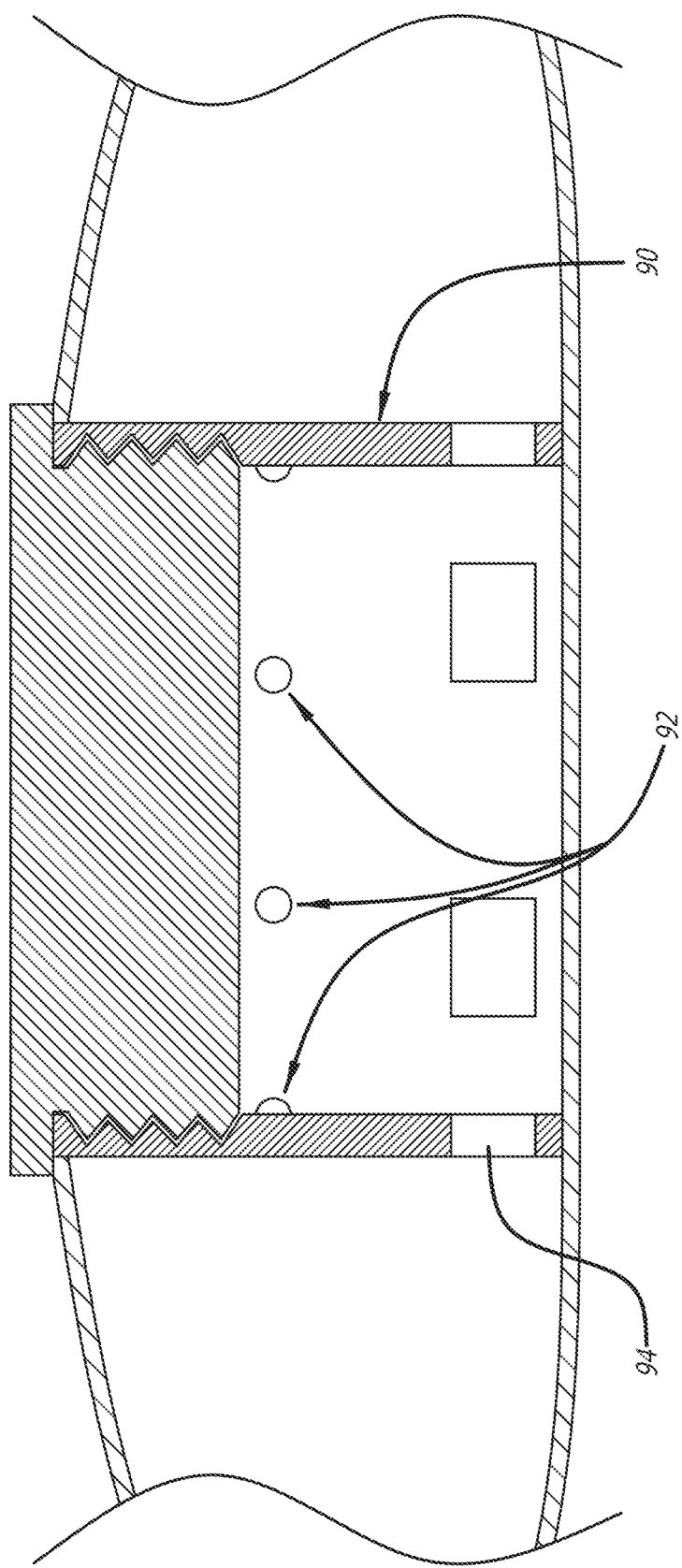
FIG. 16 is a vertical sectional view through a middle portion of a portable pet canteen having an exemplary rigid inner scaffold.

FIG. 16 is a vertical sectional view through a middle portion of an exemplary rigid inner scaffold 90 of a portable pet canteen of the present application. In this version, the rigid inner scaffold 90 has upper vent holes 92 and lower water inlet apertures 94. Alternatively, the lower apertures 94 may be formed as circular holes to reduce manufacturing costs. Indeed, any version of the scaffold disclosed herein requires apertures, holes or is otherwise perforated to permit water flow from the bladder and around the scaffold to within the cavity defined within the scaffold.

Figure 17:
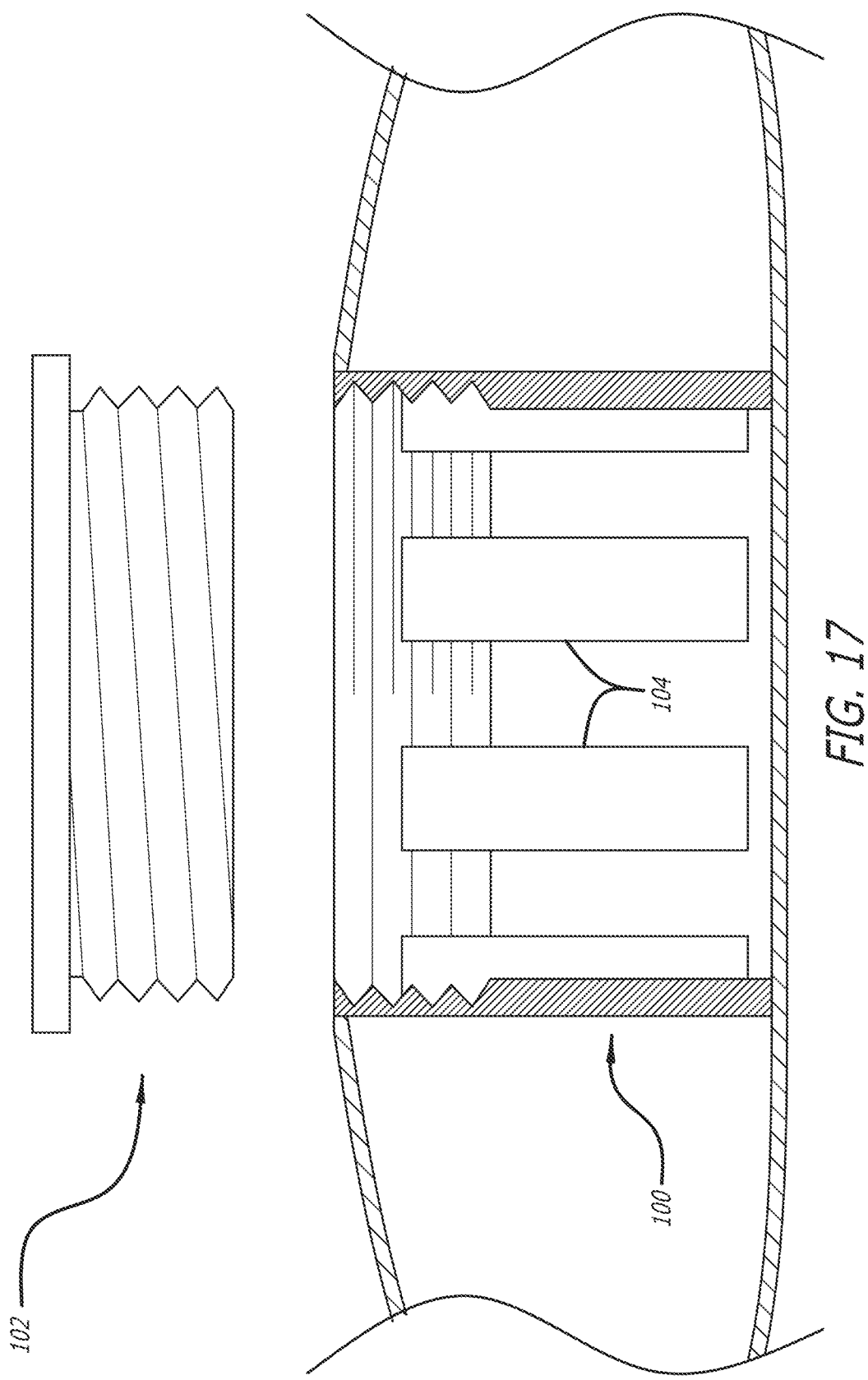
FIG. 17 is a vertical sectional view through a middle portion of a portable pet canteen having another rigid inner scaffold.

FIG. 17 is a vertical sectional view through a middle portion of another rigid inner scaffold 100 with lid 102 of a portable pet canteen of the present application. Here, the rigid inner scaffold has relatively tall water inlet apertures 104, much like the earlier-described scaffold. Multiple inlet apertures 104 are shown, though as few as one or two may be enough to ensure free flow of water into the volume defined within the scaffold 100.

Figure 18:
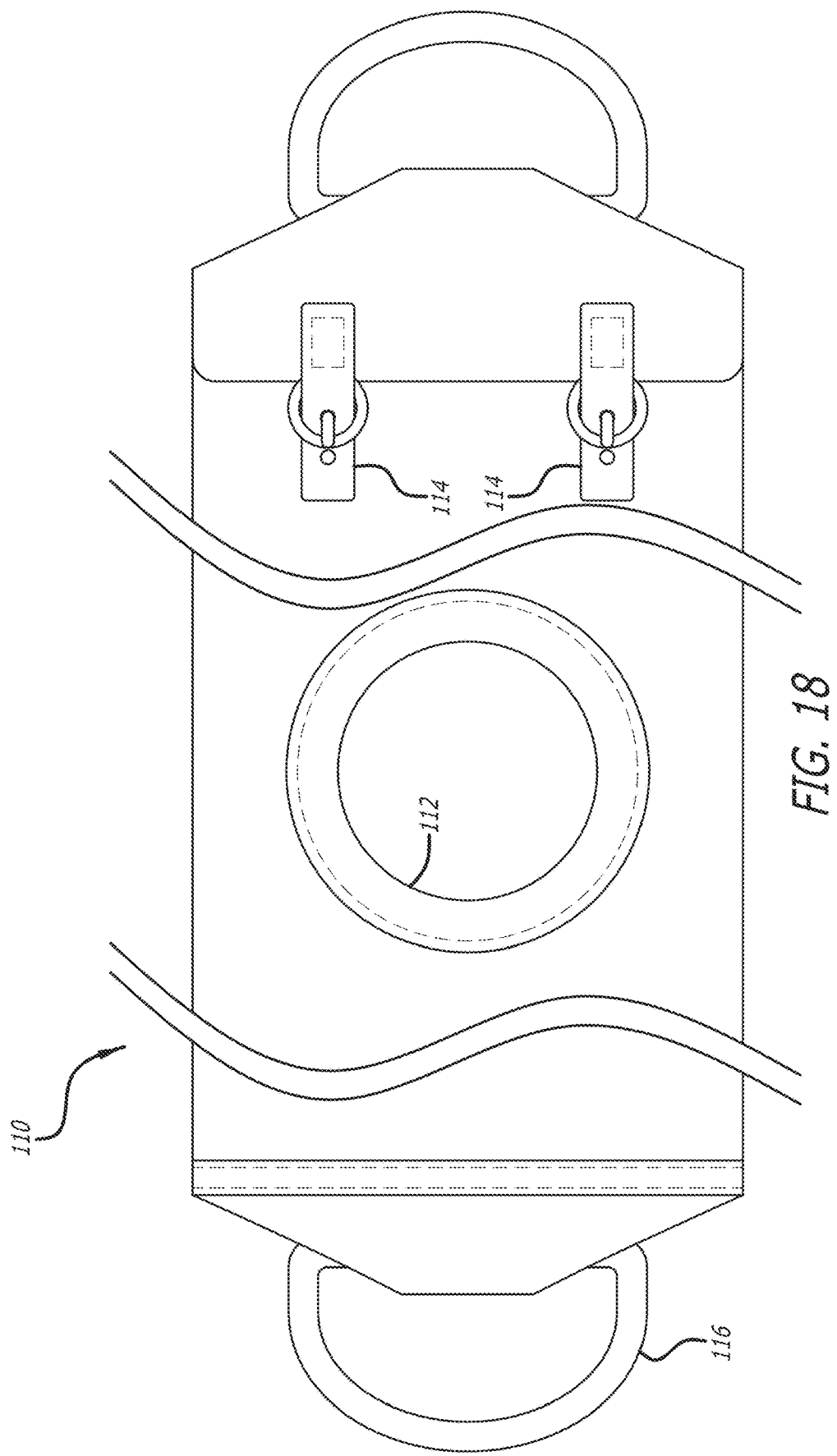
FIG. 18 is a top plan view of a flexible outer cover that may be used to enclose any of the portable pet canteens disclosed herein.

FIG. 18 is a top plan view of a flexible outer cover 110 that may be used to enclose any of the portable pet canteens disclosed herein. The outer cover may be formed of canvas, leather, polyester, nylon, or any other durable and flexible material and protects the bladder of the pet canteen. The outer cover protects the inner bladder, and has a circular opening 112 where the rigid inner scaffold and upper lid would present. Of course, any of the scaffolds/bladders described herein may be contained. The outer cover 110 may have an opening at one end for insertion of the portable pet canteen, which may be closed with, for example buckles 114 as shown. Of course, other closures such as Velcro, snaps, and the like are contemplated.

A large ring 116 on the left end is illustrated as one means of carrying the outer cover with the portable pet canteen inside. Of course, other straps or handles may be included depending on the use. For example, opposite ends of the outer cover may have straps and/or buckles so that the entire assembly may be wrapped over the top of a dog, for example, and buckled underneath so that the dog carries its own water. Likewise, the entire assembly may be secured to the back of a horse or other pack animal, vehicle, golf cart, cycle, etc. for transportation.

Figure 19:
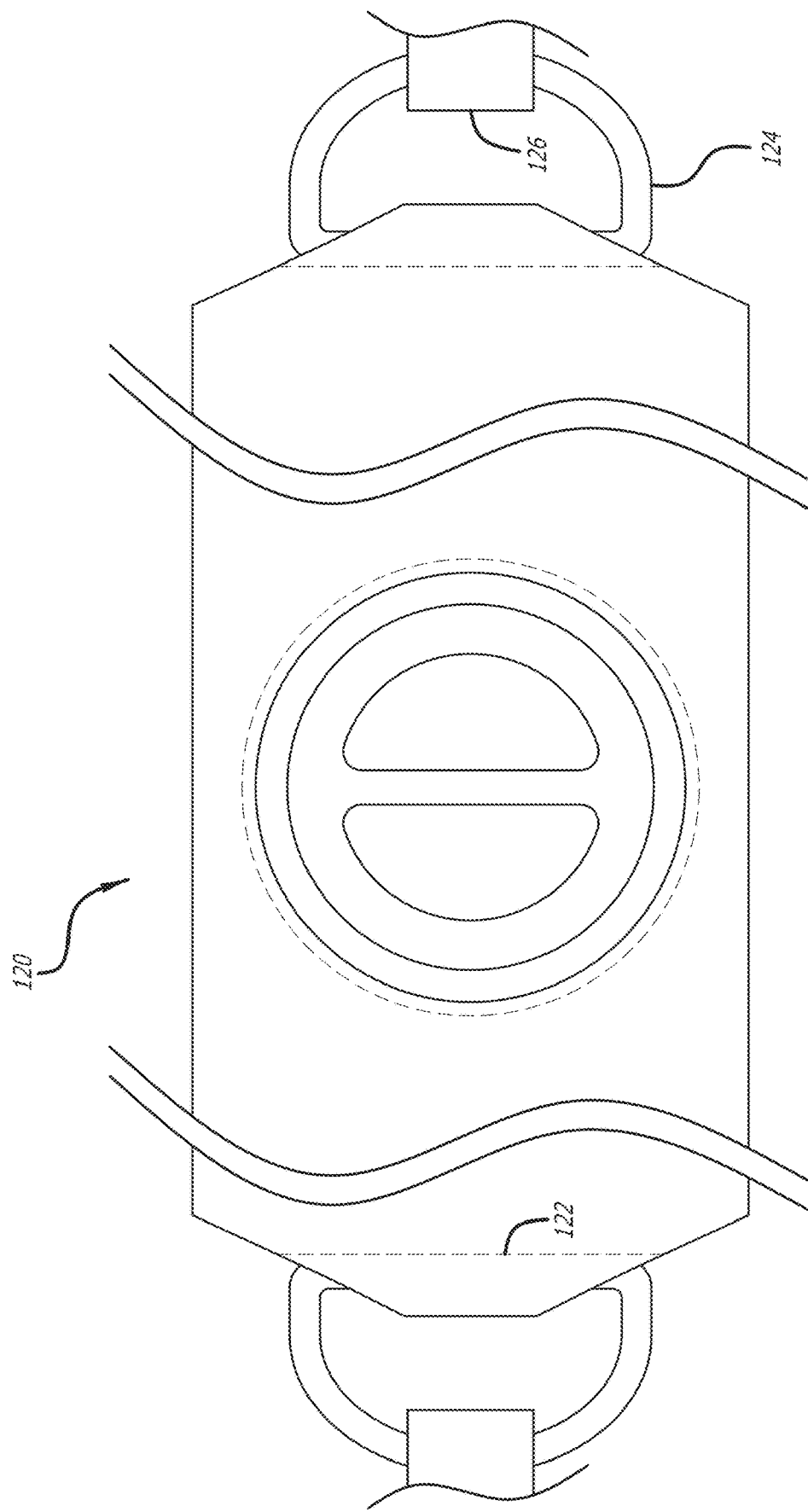
FIG. 19 is a top plan view of another flexible outer cover that may be used to enclose any of the portable pet canteens disclosed herein.

FIG. 19 is a top plan view of another "fanny-pack" style flexible outer cover 120 that may be used to enclose and protect the bladder of any of the portable pet canteens disclosed herein. In this embodiment, the flexible outer cover is made of nylon with the portable pet canteen sewn into it (as indicated by the stitching 122). On the opposite longitudinal ends of the outer cover are provided a couple of large D-rings 124 to which a strap or belt 126 may be attached. The assembly may be then carried around the waist in the style of a fanny pack, or otherwise secured around the pet itself or any other object which can transport the canteen.

Figure 20:
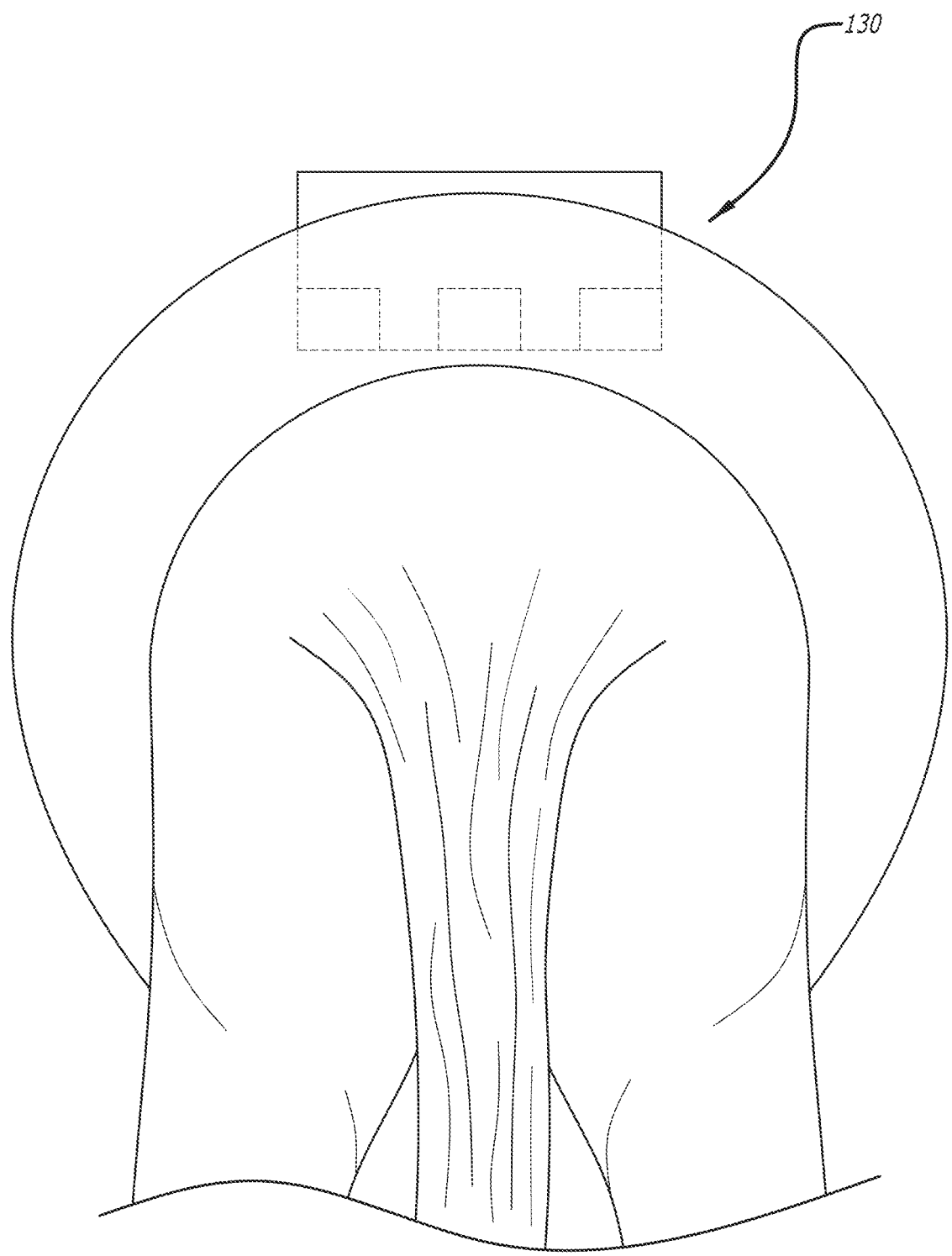
FIG. 20 is a rear view of a dog carrying one of the portable pet canteens enclosed by a flexible outer cover as disclosed herein.

FIG. 20 is a rear view of a dog carrying one of the portable pet canteens 130 disclosed herein. The canteen 130 has straps and/or buckles, or has an outer cover with such fasteners, to enable the canteen to be secured to the dog or horse. The volume of the canteen may be varied so that different sizes can be carried by different sized animals.

Figure 21:
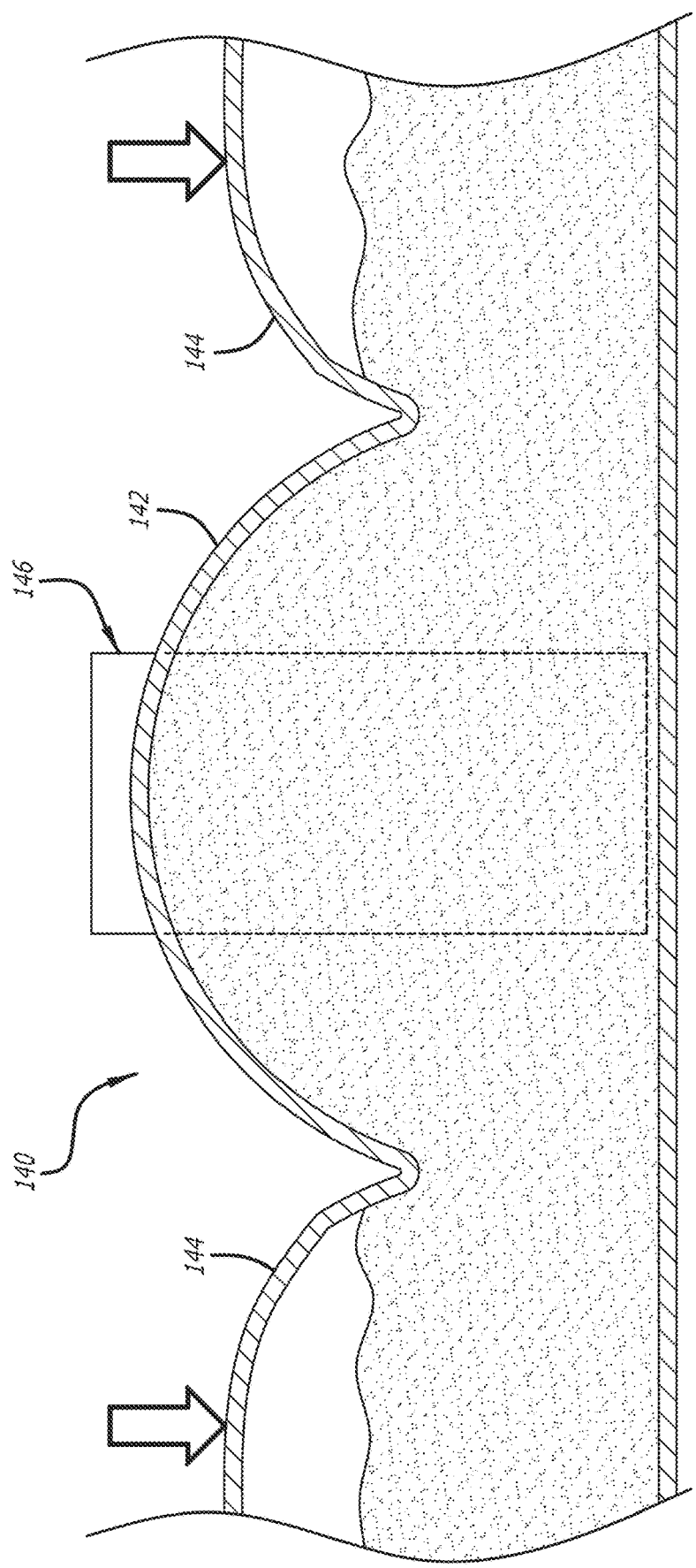
FIG. 21 is a schematic view of an alternative bladder for use in any of the portable pet canteens of the present application.

FIG. 21 is a schematic view of an alternative bladder 140 for use in any of the portable pet canteens of the present application. In this embodiment, separate compartments within the bladder each having about the same elevation may be provided with creases in between. As a middle compartment 142 drains, the pet owner may stand on the two lateral compartments 144 to force water into the inner compartment when the water level gets low. Filling the bladder 140 is done with the middle compartment 142 elevated so that water enters the two lateral compartments 144.

Figure 22:
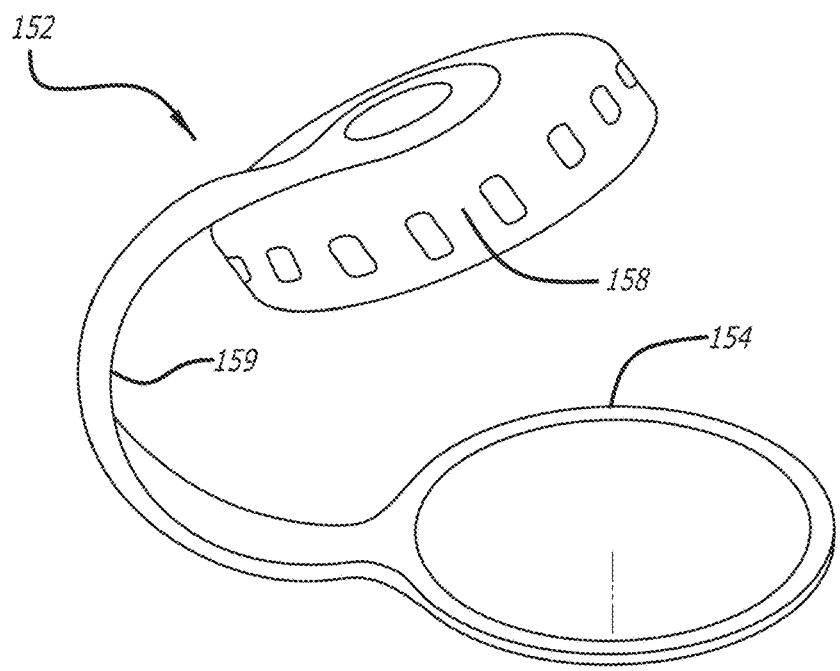
FIG. 22 is an exploded view of a scaffold representative of any of the scaffolds disclosed herein and an alternative tethered lid.

FIG. 22 is an exploded view of a scaffold 150 representative of any of the scaffolds disclosed herein and an alternative tethered lid 152. The lid 152 includes a tether ring 154 with fits around the threaded top rim 156 of the scaffold 150. A screw cap 158 with internal threads connects to the tether ring 154 with a lanyard or tether 159. In this way, the screw cap 158 may be removed from the scaffold 150 to permit a pet to drink from the canteen without worry of losing the screw cap. Alternatively, the tether 159 may be replaced with a hinge which enables the screw cap 158 to be pivoted out of the way.

Figure 23:
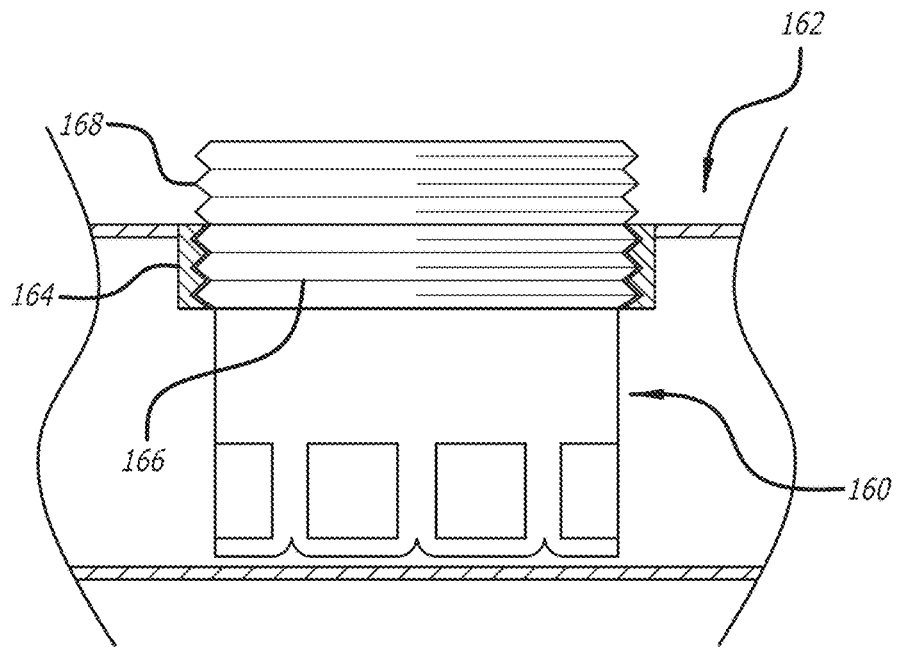
FIG. 23 is a partially cutaway view of a still further inner scaffold coupled to a conventional hydration bladder to adapt the bladder for use as a pet canteen.

FIG. 23 is a partially cutaway view of a still further inner scaffold 160 coupled to a conventional hydration bladder 162 to adapt the bladder for use as a pet canteen. Some existing hydration bladders 162 have a relatively wide top mouth 164 with female threads to receive a mating lid or cap (not shown). With this type of hydration bladder 162, the scaffold 160 may be utilized to convert the latter into a pet canteen.

More specifically, the scaffold 160 has a rigid cup-like configuration, such as described in any of the embodiments herein. At the top of the scaffold 160, two sets of male threading are provided. A lower set of male threading 166 is sized and configured to mate with the female threads 164 on the hydration bladder 162. This permits a user to remove the existing lead and insert the scaffold 160. An upper set of male threading 168 then provides a coupler for a new lid (not shown) provided with the scaffold 160. In this way, the scaffold 160 adapts existing hydration bladder to function as a pet canteen.

FIG. 24 is a schematic view of a hydration bladder 170 having a modified inner scaffold 172 adapted to convert the bladder for use as a pet canteen, and FIG. 24A is an enlargement of an upper portion of the scaffold and its lid 174. In this version, hydration bladder 170 has an upstanding boss 176 with male threads (the existing lid removed). As seen best in FIG. 24A, the scaffold 172 has a peripheral rim 178 around its upper edge which extends outward from the upstanding boss 176 on the hydration bladder. The rim 178 extends downward around and engages the upstanding boss 176 with mating female threads. Additionally, the rim 178 presents male threading which a closure lid 180 provided with the scaffold 172 engages. Again, this configuration permits the inner scaffold 172 to adapt an existing hydration bladder to function as a pet canteen.

Finally, FIGS. 25A and 25B are side elevational and top plan views of a still further modified pet canteen 190 that utilizes a bladder 192 and has a hollow interior frame 194 to prevent the bladder from collapsing. As before, the bladder 192 receives an inner rigid scaffold 196 having lid 198. The hollow interior frame 194 keeps the bladder 192 from collapsing to better distribute water within. Although not shown, the frame 194 is perforated or otherwise has a number of flow apertures/channels to permit water to distribute evenly across the floor of the bladder 192. The frame 194 is desirably a molded plastic element that may be inserted between bladder sheets and then an outer rim of the bladder is welded, bonded or otherwise sealed. The frame 194 may define a cutout 200 on one corner to accommodate the rigid scaffold 196.

While the present invention has been described and shown in considerable detail with reference to certain illustrative embodiments, including various combinations and sub-combinations of features, those skilled in the art will readily appreciate other embodiments and variations and modifications thereof as encompassed within the scope of the present invention. Moreover, the descriptions of such embodiments, combinations, and sub-combinations is not intended to convey that the invention requires features or combinations of features other than those expressly recited in the claims. Accordingly, the present invention is deemed to include all modifications and variations encompassed within the spirit and scope of the following appended claims.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A portable pet canteen, comprising:
    a flexible water-impermeable bladder having peripheral edges defining a footprint, an upper wall of the bladder defining an upper opening, and a water-tight cavity being formed within the bladder;
    a rigid inner scaffold having a smaller periphery than the footprint of the bladder secured to the upper opening of the bladder and extending into the cavity, the inner scaffold having an axial height defined by side walls surrounding an inner volume and an upper mouth with a diameter of at least 3 inches, the side walls having at least two apertures spaced apart around the periphery for free flow of water between the bladder cavity and the inner volume within the inner scaffold side walls, such that a pet may access water within the inner volume through the upper mouth; and
    an upper lid securable over the upper mouth of the inner scaffold to form a closure such that the pet canteen is watertight when closed.

2. The portable pet canteen of claim 1, wherein the water-impermeable bladder has a rectangular footprint and the inner scaffold has a circular profile as seen from above.

3. The portable pet canteen of claim 1, wherein the inner scaffold has a circular profile as seen from above and the side walls are generally tubular and vertical with at least one vertically-oriented aperture extending from a lower base of the inner scaffold upward.

4. The portable pet canteen of claim 3, wherein the base of the inner scaffold extends and is oriented radially inward from the side walls and has a central aperture for free flow of water between the bladder cavity and the inner volume within the side walls.

5. The portable pet canteen of claim 4, wherein the base has a plurality of grooves formed on an underside thereof to provide channels for water flow from around the inner scaffold to the central aperture.

6. The portable pet canteen of claim 1, wherein the inner scaffold has a base and side walls and at least one aperture extending from the base upward, the base extending radially inward from the side walls and having a central aperture for free flow of water between the bladder cavity and the inner volume within the side walls, and the base further having a plurality of grooves formed on an underside thereof to provide channels for water flow from around the inner scaffold to the central aperture.

7. The portable pet canteen of claim 1, further including a hollow interior frame positioned within the bladder to prevent the bladder from collapsing, the frame being perforated or otherwise having flow apertures/channels to permit water to distribute evenly across the floor of the bladder.

8. The portable pet canteen of claim 1, wherein the bladder comprises a component of an existing hydration bladder with a rigid rim at the upper opening and a cap adapted to engage and close the rigid rim, and wherein the inner scaffold includes mating structure for engaging the rigid rim, once the cap is removed, and converting the hydration bladder to a pet canteen.

9. The portable pet canteen of claim 1, further including a flexible outer cover sized to enclose the pet canteen and protect the bladder, the outer cover being formed of canvas, leather, polyester, or nylon.

10. The portable pet canteen of claim 9, wherein the outer cover has a harness attached thereto configured to enable the pet canteen with outer cover to be carried by a user, a pet, or any other object which can transport the canteen.

11. A portable pet canteen, comprising:
a flexible water-impermeable bladder having peripheral edges defining a footprint, an upper wall of the bladder defining an upper opening, and a water-tight cavity being formed within the bladder;
a rigid inner scaffold having a smaller periphery than the footprint of the bladder secured to the upper opening of the bladder and extending into the cavity, the inner scaffold having an axial height defined by side walls surrounding an inner volume and an upper mouth, wherein the inner scaffold has a lower base and at least one aperture in the side walls extending from the base upward for free flow of water between the bladder cavity and the inner volume, the base extending and being oriented radially inward from an inner surface of the side walls and having a central aperture for free flow of water between the bladder cavity and the inner volume within the side walls, and the base further having a plurality of radial grooves formed on an underside thereof to provide channels for water flow from around the inner scaffold to the central aperture, such that a pet may access water within the inner volume through the upper mouth; and
an upper lid securable over the upper mouth of the inner scaffold to form a closure such that the pet canteen is watertight when closed.

12. The portable pet canteen of claim 11, wherein the water-impermeable bladder has a rectangular footprint and the inner scaffold has a circular profile as seen from above.

13. The portable pet canteen of claim 11, wherein the inner scaffold has a circular profile as seen from above and the side walls are generally tubular.

14. The portable pet canteen of claim 11, further including a hollow interior frame positioned within the bladder to prevent the bladder from collapsing, the frame being perforated or otherwise having flow apertures/channels to permit water to distribute evenly across the floor of the bladder.

15. The portable pet canteen of claim 11, wherein the bladder comprises a component of an existing hydration bladder with a rigid rim at the upper opening and a cap adapted to engage and close the rigid rim, and wherein the inner scaffold includes mating structure for engaging the rigid rim, once the cap is removed, and converting the hydration bladder to a pet canteen.

16. The portable pet canteen of claim 11, further including a flexible outer cover sized to enclose the pet canteen and protect the bladder, the outer cover being formed of canvas, leather, polyester, or nylon.

17. The portable pet canteen of claim 16, wherein the outer cover has a harness attached thereto configured to enable the pet canteen with outer cover to be carried by a user, a pet, or any other object which can transport the canteen.

18. The portable pet canteen of claim 11, wherein there are just two diametrically-opposed apertures.

19. The portable pet canteen of claim 18, wherein the apertures extend downward and intersect the base so that they are open to the bottom of the scaffold.

20. The portable pet canteen of claim 18, wherein there are just two grooves aligned radially with each other and extending perpendicularly relative to a diametric alignment of the apertures.

* * * * *